(12) United States Patent
Senecal et al.

(10) Patent No.: US 12,215,181 B2
(45) Date of Patent: Feb. 4, 2025

(54) ANIONIC GROUP III COMPLEXES AS WEAKLY COORDINATING ANIONS FOR OLEFIN POLYMERIZATION CATALYST ACTIVATORS

(71) Applicant: Dow Global Technologies LLC, Midland, MI (US)

(72) Inventors: Todd D. Senecal, Midland, MI (US); Sukrit Mukhopadhyay, Midland, MI (US); Richard J. Keaton, Freeport, TX (US); Jerzy Klosin, Midland, MI (US); Rafael Huacuja, Freeport, TX (US); David M. Pearson, Lake Jackson, TX (US); William H. H. Woodward, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 770 days.

(21) Appl. No.: 17/599,095

(22) PCT Filed: Mar. 24, 2020

(86) PCT No.: PCT/US2020/024397
§ 371 (c)(1),
(2) Date: Sep. 28, 2021

(87) PCT Pub. No.: WO2020/198196
PCT Pub. Date: Oct. 1, 2020

(65) Prior Publication Data
US 2022/0162352 A1 May 26, 2022

Related U.S. Application Data

(60) Provisional application No. 62/825,182, filed on Mar. 28, 2019.

(51) Int. Cl.
| | | |
|---|---|---|
| *C07F 7/00* | (2006.01) | |
| *C07F 5/00* | (2006.01) | |
| *C07F 7/28* | (2006.01) | |
| *C08F 4/64* | (2006.01) | |
| *C08F 4/659* | (2006.01) | |
| *C08F 4/6592* | (2006.01) | |
| *C08F 210/16* | (2006.01) | |

(52) U.S. Cl.
CPC .......... *C08F 4/64193* (2013.01); *C07F 5/003* (2013.01); *C07F 7/00* (2013.01); *C07F 7/28* (2013.01); *C08F 4/65908* (2013.01); *C08F 210/16* (2013.01)

(58) Field of Classification Search
CPC ................. C07F 5/00; C07F 9/00; C08F 4/64
See application file for complete search history.

(56) References Cited

U.S. PATENT DOCUMENTS

| | | |
|---|---|---|
| 6,214,760 B1 | 4/2001 | Chen et al. |
| 6,344,529 B1 | 2/2002 | Carnahan et al. |
| 6,541,410 B1 | 4/2003 | Rodriguez |
| 6,777,509 B2 | 8/2004 | Brown et al. |
| 6,869,904 B2 | 3/2005 | Boussie et al. |
| 6,900,321 B2 | 5/2005 | Boussie et al. |
| 6,953,764 B2 | 10/2005 | Frazier et al. |
| 7,650,930 B2 | 1/2010 | Cheluget et al. |
| 8,372,927 B2 | 2/2013 | Figueroa et al. |
| 2004/0199021 A1 | 10/2004 | Rodriquez |
| 2009/0270571 A1 | 10/2009 | Wang et al. |

FOREIGN PATENT DOCUMENTS

| | | |
|---|---|---|
| CN | 1261898 A | 8/2000 |
| CN | 1437618 A | 8/2003 |
| WO | 1999041294 A1 | 8/1999 |
| WO | 2007136496 A2 | 11/2007 |
| WO | 2010022228 A2 | 2/2010 |
| WO | 2011102989 A1 | 8/2011 |
| WO | 2013053046 A1 | 4/2013 |
| WO | 2016109429 A1 | 7/2016 |
| WO | 2017173080 A1 | 10/2017 |

OTHER PUBLICATIONS

Brazilian Office Action dated Sep. 5, 2023, pertaining to BR Patent Application No. BR112021019091, 4 pgs.

(Continued)

*Primary Examiner* — Caixia Lu
(74) *Attorney, Agent, or Firm* — Dinsmore & Shohl LLP

(57) ABSTRACT

Embodiments include activators having a structure according to formula (I).

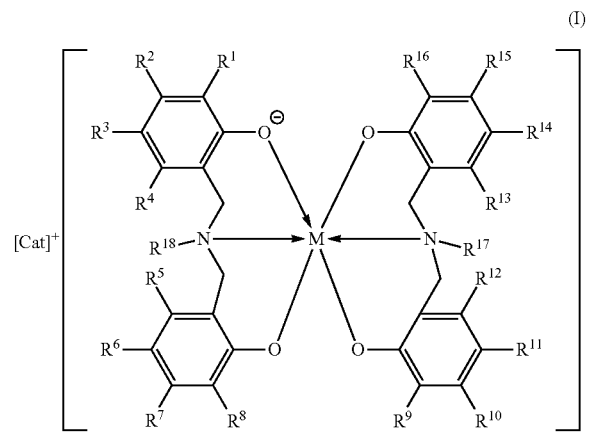

11 Claims, No Drawings

(56) References Cited

OTHER PUBLICATIONS

Japanese Office Action dated Apr. 2, 2024, pertaining to JP Patent Application No. 2021-557600, 6 pgs.
Clark, Dictationic and zwitterionic catalysts for the amine-initiated, immortal ring-opening polmerisation of rac-lactide: facile synthesis of amine-terminated, highly heterotactic PLA, ChemComm, 2010, 273-275, vol. 46, The Royal Society of Chemistry.
Liang, Synthesis and characterization of benzoxazine-functionalized amine bridged bis(phenolate) lanthanide complexes and their application in the ring-opening polymerization of cyclic esters, Dalton Transation, 2012, 2812-2819, 41, The Royal Society of Chemistry.
International Preliminary Report on Patentability for Application No. PCT/US2020/024397, issued Sep. 28, 2021, pp. 1-3.
Communication pursuant to Rules 161 (1) and 162 for EP Application No. 20722391.8, issued on May 11, 2021, pp. 1-3.
Boyd, C. L. et al., "Synthesis, structures, and reactions of titanium, scandium, and yttrium complexes of diamino-bis (phenolate) ligands: monomeric, dimeric, neutral, cationic, and multiply bonded derivatives", Organometallics, American Chemical Society, vol. 24, No. 2, pp. 309-330 (Jan. 17, 2005).
Metz, M. V. et al., "Weakly coordinating AL-, NB-, TS-, Y-, and La-Based perfluoroaryloxymetalate anions as cocatalyst components for single-site olefin polymerization", Organometallics, American Chemical Society, vol. 21, No. 18, pp. 3691-3702 (Sep. 2, 2002).
International Search Report and Written Opinion issued by the European Patent Office acting as International Searching Authority for International Patent Application No. PCT/US2020/024397 dated Jun. 23, 2020 (15 pages in total).
Chinese Office Action and Search Report dated Jan. 13, 2023, pertaining Chinese Patent Application No. 202080024665.X, 14 pages.
Japanese Office Action dated Jul. 2, 2024, pertaining to JP Patent Application No. 2021-557600, 4 pgs.

ANIONIC GROUP III COMPLEXES AS WEAKLY COORDINATING ANIONS FOR OLEFIN POLYMERIZATION CATALYST ACTIVATORS

CROSS REFERENCE TO RELATED APPLICATIONS

This application claims priority to U.S. Provisional Patent Application No. 62/825,182, filed on Mar. 28, 2019, the entire disclosure of which is hereby incorporated by reference.

TECHNICAL FIELD

Embodiments of the present disclosure generally relate to olefin polymerization catalyst systems and processes and, more specifically the catalyst systems include a procatalyst and an anionic yttrium complex or co-catalyst.

BACKGROUND

As part of the catalyst composition in α-olefin polymerization reactions, the activator may have characteristics that are beneficial for the production of the α-olefin polymer and for final polymer compositions including the α-olefin polymer. Activator characteristics that increase the production of α-olefin polymers include, but are not limited to: rapid procatalyst activation, high catalyst efficiency, high temperature capability, consistent polymer composition, and selective deactivation.

Olefin based polymers such as ethylene-based polymers and propylene-based polymers are produced via various catalyst systems. Selection of such catalyst systems can be an important factor contributing to the characteristics and properties of olefin-based polymers. The catalyst systems for producing polyethylene-based polymers may include a chromium-based catalyst system, a Ziegler-Natta catalyst system, or a molecular (either metallocene or non-metallocene) catalyst system.

As part of the catalyst system, the molecular polymerization procatalyst is activated to generate the catalytically active species for polymerization, and this can be achieved by any number of means. One such method employs an activator or co-catalyst that is a Brønsted acid. Brønsted acid salts containing weakly coordinating anions are commonly utilized to activate molecular polymerization procatalysts, particularly such procatalysts comprising Group IV metal complexes. Brønsted acid salts that are fully ionized are capable of transferring a proton to form a cationic derivative of such Group IV metal complexes.

For activators such as Brønsted acid salts, the cationic component may include cations capable of transferring a hydrogen ion such as ammonium, sulfonium, or phosphonium for example; or oxidizing cations such as ferrocenium, silver, or lead, for example; or highly Lewis acidic cations such as carbonium or silylium, for example.

SUMMARY

Desirable characteristics of activators in polymer systems include abilities to increase the production of olefin-based polymers, to increase the rate of procatalyst activation, to increase the overall efficiency of the catalyst, to enable the catalyst system to operate at high temperatures, to enable the catalyst system to provide consistent polymer composition, and to enable decomposition of the activator after olefin polymerization is complete. Activators derived from the non-coordinating anion tetrakis(pentafluorophenyl)borate ($^-B(C_6F_5)_4$) capture many of these desirable characteristics.

There are ongoing needs for activators that efficiently activate a metal-ligand procatalyst that perform well at high temperature.

Embodiments of this disclosure include activators having a structure according to formula (I):

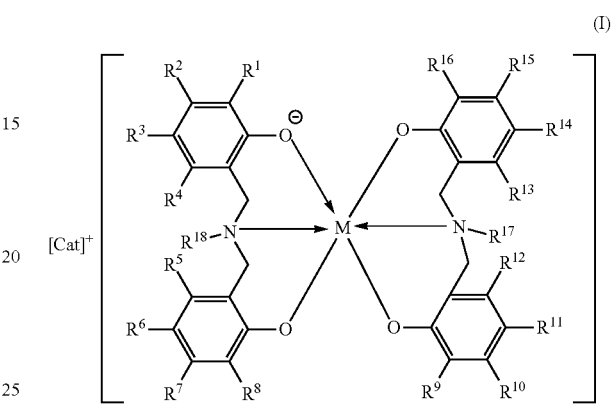

In formula (I), M is a metal in a +3 oxidation state, the metal being selected from boron, aluminum, gallium, scandium, yttrium, or a lanthanide and $[Cat]^+$ is a cation.

In formula (I), $R^1$, $R^2$, $R^3$, $R^4$ $R^5$, $R^6$, $R^7$, $R^8$, $R^9$, $R^{10}$, $R^{11}$, $R^{12}$, $R^{13}$, $R^{14}$, $R^{15}$, and $R^{16}$ are independently chosen from $(C_1-C_{40})$alkyl, $(C_6-C_{40})$aryl, —H, —NRN$_2$, —OR$^C$, —SR$^C$, or halogen, wherein each $R^C$ and each $R^N$ is independently a $(C_1-C_{30})$hydrocarbyl or —H, provided at least one of $R^{1-4}$, and one of $R^{5-8}$, and one of $R^{9-12}$, and one of $R^{13-16}$ is a fluorine-substituted $(C_1-C_{40})$alkyl, a fluorine-substituted $(C_6-C_{40})$aryl, or —F; and each $R^{17}$ and $R^{18}$ is $(C_1-C_{40})$alkyl, $(C_1-C_{40})$heteroalkyl, or —F.

DETAILED DESCRIPTION

Specific embodiments of catalyst systems will now be described. It should be understood that the catalyst systems of this disclosure may be embodied in different forms and should not be construed as limited to the specific embodiments set forth in this disclosure.

Common abbreviations are listed below:

R, Y, M, L, Q, and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; ($^tBu^FO)_3$Al: Al(OC (CF$_3$)$_3$)$_3$; KHMDS: potassium hexamethyldisilazide; MTBE: methyl tert-butyl ether; TEA: triethylaluminum; THF: tetrahydrofuran; Et$_2$O: diethyl ether; CH$_2$Cl$_2$: dichloromethane; MTBE: methyl tert-butyl ether; CV: column volume (used in column chromatography); EtOAc: ethyl acetate; C$_6$D$_6$: deuterated benzene or benzene-d6: CDCl$_3$: deuterated chloroform; Na$_2$SO$_4$: sodium sulfate; MgSO$_4$: magnesium sulfate; HCl: hydrogen chloride; n-BuLi: butyllithium; t-BuLi: tert-butyllithium; N$_2$: nitrogen gas; PhMe: toluene; PPR: parallel polymerization reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar;

min or mins: minutes; h or hrs: hours; d: days; Rr; retention fraction; TLC: thin layered chromatography; rpm: revolution per minute.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^S$ may all be substituted alkyls or $R^1$ and $R^2$ may be a substituted alkyl and $R^3$ may be an aryl, etc). A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl ($-C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "—H" means a hydrogen or hydrogen radical that is covalently bonded to another atom. "Hydrogen" and "—H" are interchangeable, and unless clearly specified have identical meanings.

The term "halogen-substituted" means that at least one hydrogen atom (—H) bonded to a carbon atom or heteroatom of a corresponding unsubstituted compound or functional group is replaced by a halogen. The term "halogen-substituted" and "halogenated" are interchangeable. The term "perhalogenated" means that every hydrogen atom (—H) bonded to a carbon atom or heteroatom of a corresponding unsubstituted compound or functional group is replaced by a halogen. The term "fluorine-substituted" means that at least one hydrogen atom (—H) bonded to a carbon atom or heteroatom of a corresponding unsubstituted compound or functional group is replaced by a fluorine atom. The term "fluoroalkyl" refers to a fluorine-substituted $(C_1-C_{10})$alkyl, in which at least one hydrogen atom bonded to the carbon atom of the $(C_1-C_{10})$alkyl is replaced with a fluorine atom.

In this disclosure, the term "halogen atom" or "halogen" means the radical of a fluorine atom (F) or chlorine atom (Cl). The term "halide" means anionic form of the halogen atom: fluoride ($F^-$) or chloride ($Cl^-$).

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl ($-CH_2-C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis($[C_{20}]$alkyl)-phenyl; 2-$(C_1-C_5)$alkyl-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1.3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —CH$_2$CH$_2$—), propan-1,3-diyl (i.e. —CH$_2$CH$_2$CH$_2$—), 2-methylpropan-1,3-diyl (i.e. —CH$_2$CH(CH$_3$)CH$_2$—). Some examples of $(C_6-C_{50})$ arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a (CI-Cis) alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo [2.2.2]octane.

The term "$(C_3-C_{50})$cycloalkylene" means a cyclic of from 3 to 50 carbon atoms that is unsubstituted or substituted by one or more $R^S$. Both radicals of the cyclic diradical are on ring atoms of the cyclic diradical.

The term "heteroatom," refers to an atom other than hydrogen or carbon. Examples of groups containing one or more than one heteroatom include O, S, S(O), S(O)$_2$, Si(R$^C$)$_2$, P(R$^P$), N(R$^N$), —N=C(R$^C$)$_2$, —Ge(R$^C$)$_2$—, or —Si(R$^C$)—, where each $R^C$ and each $R^P$ is unsubstituted $(C_1-C_{18})$hydrocarbyl or —H, and where each $R^N$ is unsubstituted (CI-Cis)hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The term "$(C_1-C_{50})$heterohydrocarbon anion" means an anionic heterohydrocarbon having from 1 to 50 carbon atoms and a formal charge of negative one (–1). The formal charge may be associated with a heteroatom, provided that there is more than one heteroatom in the anionic heterohydrocarbon. The heterohydrocarbon anion is aromatic or non-aromatic, saturated or unsaturated, straight chain or branched chain, cyclic (having three carbons or more, and including monocyclic and poly-cyclic, fused and non-fused polycyclic, and bicyclic) or acyclic, and substituted by one or more $R^S$ or unsubstituted. When the heteroaromatic anion is aromatic ("$(C_1-C_{50})$heteroaromatic anion"), at least one heteroatom is within the aromatic system. The lone pairs of electron of the anion of the heteroaromatic anion are not a part of the aromatic system, and are available to form ionic bonds or dative covalent bonds.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-S(O)$_2$—. $(C_1-C_{50})$hydrocarbyl-Si(R$^C$)$_2$—, $(C_1-C_{50})$hydrocarbyl-N(R$^N$)—, $(C_1-C_{50})$hydrocarbyl-P(R$^P$)—, $(C_2-C_{50})$heterocycloalkyl, $(C_2-C_{19})$heterocycloalkyl-$(C_1-C_{20})$alkylene. $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{29})$heteroalkylene, or $(C_1-C_{19})$heteroaryl-$(C_1-C_{20})$heteroalkylene.

The term "$(C_4-C_{50})$heteroaryl" means an unsubstituted or substituted (by one or more $R^S$) monocyclic, bicyclic, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring.

The 5-membered ring monocyclic heteroaromatic hydrocarbon radical has 5 minus h carbon atoms, where h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl.

The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl.

The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radical containing one to fifty carbon atoms, and one or more heteroatom. The term "$(C_1-C_{50})$heteroalkylene" means a saturated straight or branched chain diradical containing from 1 to 50 carbon atoms and one or more than one heteroatoms. The heteroatoms of the heteroalkyls or the heteroalkylenes may include $Si(R^C)_3$, $Ge(R^C)_3$. $Si(R^C)_2$, $Ge(R^C)_2$, $P(R^N)$, $P(R^P)$, $N(R^N)_2$. $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

Embodiments of this disclosure include activators, catalyst systems that include activators, and processes for polymerizing olefins. In embodiments, the activator has a structure according to formula (I):

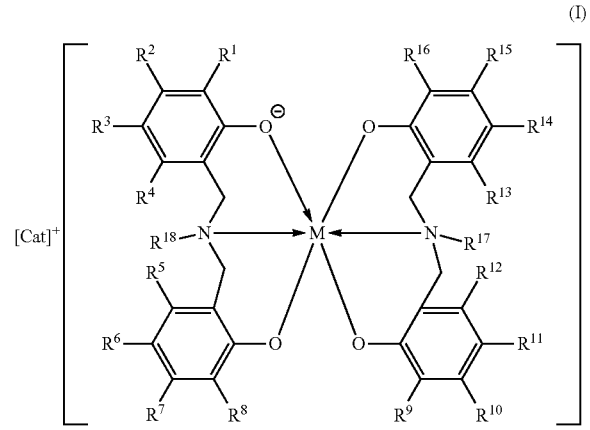

(I)

In formula (I), M is a metal in a +3 oxidation state, the metal being selected from boron, aluminum, gallium, scandium, yttrium, or a lanthanide.

In formula (I), $R^1$, $R^2$, $R^3$, $R^4$ $R^5$, $R^6$, $R^7$, $R^8$, $R^9$, $R^{10}$, $R^{11}$, $R^{12}$, $R^{13}$, $R^{14}$, $R^{15}$, and $R^{16}$ are independently chosen from $(C_1-C_{40})$alkyl, $(C_6-C_{40})$aryl, —H, —$NRN_2$, —$OR^C$, —$SR^C$, or halogen, wherein each $R^C$ and each $R^N$ is independently a $(C_1-C_{30})$hydrocarbyl or —H, provided at least one of $R^{1-4}$, and one of $R^{5-8}$, and one of $R^{9-12}$, and one of $R^{13-16}$ is a fluorine-substituted $(C_1-C_{40})$alkyl, a fluorine-substituted $(C_6-C_{40})$aryl, or —F; and each $R^{17}$ and $R^{18}$ is $(C_1-C_{40})$alkyl or $(C_1-C_{40})$heteroalkyl.

In one or more embodiments, the activator complex includes a cation as indicated by $[Cat]^+$. $[Cat]^+$ is a cation having a formal charge of positive one (+1). In some embodiments of the activator, $[Cat]^+$ is chosen from a protonated tri[$(C_1-C_{40})$hydrocarbyl] ammonium cation. In some embodiments, $[Cat]^+$ is a protonated trialkylammonium cation, containing one or two $(C_{14}-C_{20})$alkyl on the ammonium cation. In one or more embodiments, $[Cat]^+$ is $^+N(H)R^N_3$, wherein each $R^N$ is independently $(C_1-C_{20})$alkyl. In some embodiments, $[Cat]^+$ is $^+N(CH_3)HR^N_2$, wherein $R^N$ is $(C_{16}-C_{18})$alkyl. In some embodiments. $[Cat]^+$ is chosen from methyldi(octadecyl)ammonium cation or methyldi(hexadecyl)ammonium cation. The methyldi(octadecyl)ammonium cation or methyldi(hexadecyl)ammonium cation are collectively referred to herein as armeenium cations. Ionic compounds having an armeenium cations are available from Akzo-Nobel under the trade name Armeen™ M2HT. In other embodiments, $[Cat]^+$ is triphenylmethyl carbocation ($Ph_3C^+$), also referred to as trityl. In one or more embodiments, $[Cat]^+$ is a tris-substituted-triphenylmethyl carbocation, such as $^+C(C_6H_4R^C)_3$, wherein each $R^C$ is independently chosen from $(C_1-C_{30})$alkyl. In other embodiments, $[Cat]^+$ is chosen from anilinium, ferrocenium, or aluminoceniums. Anilinium cations are protonated nitrogen cations, such as $[HN(R^S)(R^N)_2]+$, where $R^N$ is $(C_1-C_{20})$alkyl and $R^S$ is chosen from $(C_1-C_{30})$alkyl, $(C_6-C_{20})$aryl, $(C_5-C_{20})$heteroaryl, or —H, and each alkyl, aryl or heteroaryl may be further substituted with —$OR^C$. Aluminoceniums are aluminum cations, such as $R^S_2Al(THF)_2+$, where $R^S$ is chosen from $(C_1-C_{30})$alkyl.

In one or more embodiments, $R^1$, $R^2$, $R^3$, $R^4$ $R^5$, $R^6$, $R^7$, $R^8$, $R^9$, $R^{10}$, $R^{11}$, $R^{12}$, $R^{13}$, $R^{14}$, $R^{15}$, and $R^{16}$ are independently $(C_1-C_{10})$alkyl, —F, or —H, provided at least one of $R^{1-4}$, and one of $R^{5-8}$, and one of $R^{9-12}$, and one of $R^{13-16}$ is a fluorine-substituted $(C_1-C_{10})$alkyl or —F.

In some embodiments, $R^1$, $R^8$, $R^9$, $R^{16}$ is $(C_1-C_{10})$alkyl. In various embodiments, $R^1$, $R^8$, $R^9$, $R^{16}$ is chosen from methyl, ethyl, n-propyl, 2-propyl, n-butyl, tert-butyl, pentyl, hexyl, heptyl, n-octyl, tert-octyl, nonyl, or decyl.

In one or more embodiments, at least one of $R^1$, $R^2$, $R^3$, and $R^4$ is —F or fluoroalkyl, at least one of $R^5$, $R^6$, $R^7$, and $R^8$ is —F or fluoroalkyl, at least one of $R^9$, $R^{10}$, $R^{11}$, and $R^{12}$ is —F or fluoroalkyl, and at least one of $R^{13}$, $R^{14}$, $R^{15}$, and $R^{16}$ is —F or fluoroalkyl.

In some embodiments, at least two of $R^1$, $R^2$, $R^3$, and $R^4$ are —F or fluoroalkyl, at least two of $R^5$, $R^6$, $R^7$, and $R^8$ are —F or fluoroalkyl, at least two of $R^9$, $R^{10}$, $R^{11}$, and $R^{12}$ are —F or fluoroalkyl, and at least two of $R^{13}$, $R^{14}$, $R^{15}$, and $R^{16}$ are —F or fluoroalkyl. In other embodiments, at least three of $R^1$, $R^2$, $R^3$, and $R^4$ are —F or fluoroalkyl, at least three of $R^5$, $R^6$, $R^7$, and $R^8$ are —F or fluoroalkyl, at least three of $R^9$, $R^{10}$, $R^{11}$, and $R^{12}$ are —F or fluoroalkyl, and at least three of $R^{13}$, $R^{14}$, $R^{15}$, and $R^{16}$ are —F or fluoroalkyl.

In any embodiment in which any one of $R^1$, $R^2$, $R^3$, $R^4$ $R^5$, $R^6$, $R^7$, $R^8$, $R^9$, $R^{10}$, $R^{11}$, $R^{12}$, $R^{13}$, $R^{14}$, $R^{15}$, and $R^{16}$ is fluoroalkyl, the fluoroalkyl may include, but is not limited to, —$C(CF_3)_3$, —$CF_3$, —$CF_2(CF_2).CF_3$, in which n is 0 to 10.

In illustrative embodiments, the activator has a structure according to formula (I). The illustrative embodiments of the activator of formula (I) include the following structures:

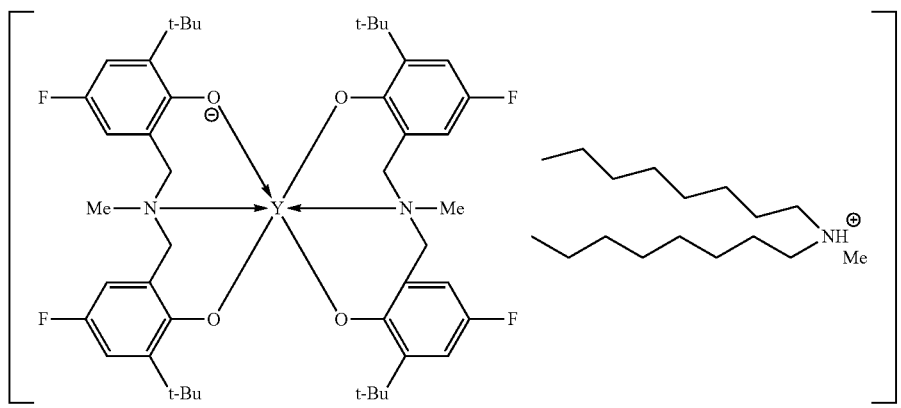

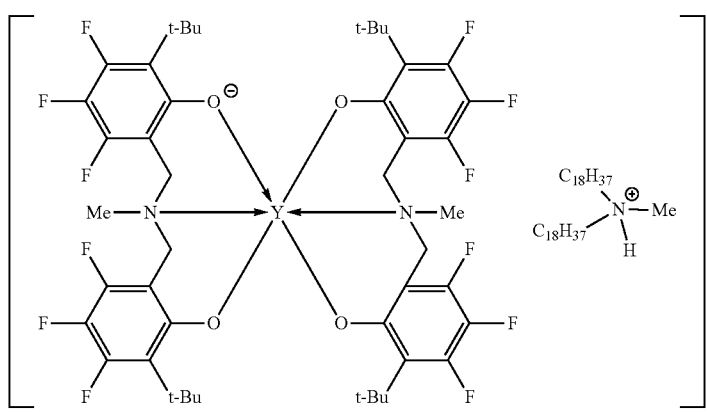

Catalyst System Components

Embodiments of this disclosure include catalyst systems. In one or more embodiments, the catalyst system comprises an activator according to formula (I) and a procatalyst. The procatalyst may be rendered catalytically active by contacting the complex to, or combining the complex with, the activator of formula (I). The procatalyst may be chosen from a Group IV metal-ligand complex (Group IVB according to CAS or Group 4 according to IUPAC naming conventions), such as a titanium (Ti) metal-ligand complex, a zirconium (Zr) metal-ligand complex, or a hafnium (Hf) metal-ligand complex. Not intending to be limiting, examples of such procatalysts include procatalysts disclosed in the following references: U.S. Pat. No. 8,372,927; WO 2010022228; WO 2011102989; U.S. Pat. Nos. 6,953,764; 6,900,321; WO 2017173080; U.S. Pat. Nos. 7,650,930; 6,777,509 WO 99/41294; U.S. Pat. No. 6,869,904; WO 2007136496. These references are incorporated by reference herein in their entirety.

In one or more embodiments, the Group IV metal-ligand complex includes a bis-biphenylphenoxy Group IV metal-ligand complex or a constrained geometry Group IV metal-ligand complex.

According to some embodiments, the bis-biphenylphenoxy metal-ligand complex has a structure according to formula (X):

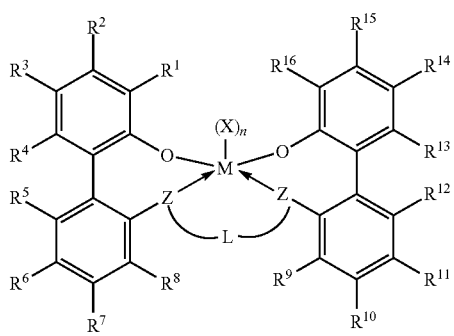

In formula (X), M is a metal chosen from titanium, zirconium, or hafnium, the metal being in a formal oxidation state of +2, +3, or +4. Subscript n of (X) is 0, 1, or 2. When subscript n is 1, X is a monodentate ligand or a bidentate ligand, and when subscript n is 2, each X is a monodentate ligand. Each Z is independently chosen from —O—, —S—, —N($R^N$)—, or —P($R^P$)—; $R^1$ and $R^{16}$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, —N=C($R^C$)$_2$, $R^C$C(O)O—, $R^C$OC(O)—, $R^C$C(O)N(R)—, ($R^C$)$_2$NC(O)—, halogen, radicals having formula (XI), radicals having formula (XII), and radicals having formula (XIII):

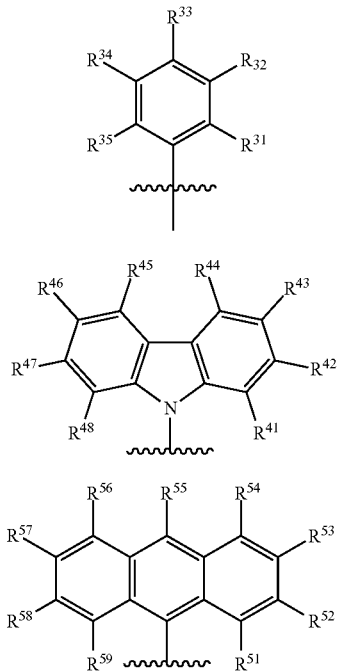

In formulas (XI), (XII), and (XIII), each of $R^{31-35}$, $R^{41-48}$, and $R^{51-59}$ is independently chosen from —H, $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, RCS(O)—, RCS(O)$_2$—, $(R^C)_2$C=N—, $R^C$C(O)O—, $R^C$OC(O)—, $R^C$C(O)N$(R^N)$—, $(R^C)_2$NC(O)—, or halogen, provided at least one of $R^1$ or $R^{16}$ is a radical having formula (XI), a radical having formula (XII), or a radical having formula (XIII).

In one or more embodiments, each X of formula (X) can be a monodentate ligand that, independently from any other ligands X, is a halogen, unsubstituted $(C_1-C_{20})$hydrocarbyl, unsubstituted $(C_1-C_{20})$hydrocarbylC(O)O—, or $R^K R^L N$—, wherein each of $R^K$ and $R^L$ independently is an unsubstituted $(C_1-C_{20})$hydrocarbyl.

Illustrative bis-biphenylphenoxy metal-ligand complexes that may be employed in the practice of the present invention include:
(2',2"-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol)dimethyl-hafnium;
(2',2"-(propane-1,3-diylbis(oxy))bis(3-(3,6-di-tert-butyl-9H-carbazol-9-yl)-3'-chloro-5-(2,4,4-trimethylpentan-2-yl)biphenyl-2-ol)dimethyl-hafnium;
(2',2"-(propane-1,3-diylbis(oxy))bis(3'-chloro-3-(3,6-di-tert-butyl-9H-carbazol-9-yl)-5'-fluoro-5-(2,4,4-trimethylpentan-2-yl)biphenyl-2-ol)dimethyl-hafnium;
(2',2"-(propane-1,3-diylbis(oxy))bis(3-(3,6-di-tert-butyl-9H-carbazol-9-yl)-3'-methyl-5-(2,4,4-trimethylpentan-2-yl)biphenyl-2-ol)dimethyl-hafnium;
(2',2"-(propane-1,3-diylbis(oxy))bis(5'-cyano-3-(3,6-di-tert-butyl-9H-carbazol-9-yl)-3'-methyl-5-(2,4,4-trimethylpentan-2-yl)biphenyl-2-ol)dimethyl-hafnium;
(2',2"-(propane-1,3-diylbis(oxy))bis(5'-dimethylamino-3-(3,6-di-tert-butyl-9H-carbazol-9-yl)-3'-methyl-5-(2,4,4-trimethylpentan-2-yl)biphenyl-2-ol)dimethyl-hafnium;
(2',2"-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol)dimethyl-hafnium;
(2',2"-(propane-1,3-diylbis(oxy))bis(5'-chloro-3-(3,6-di-tert-butyl-9H-carbazol-9-yl)-3'-ethyl-5-(2,4,4-trimethylpentan-2-yl)biphenyl-2-ol)dimethyl-hafnium;
(2',2"-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol)dimethyl-hafnium;
(2',2"-(propane-1,3-diylbis(oxy))bis(3-(3,6-di-tert-butyl-9H-carbazol-9-yl)-5'-fluoro-3'-methyl-5-(2,4,4-trimethylpentan-2-yl)biphenyl-2-ol)dimethyl-hafnium;
(2',2"-(propane-1,3-diylbis(oxy))bis(3-(9H-carbazol-9-yl)-5'-chloro-3'-methyl-5-(2,4,4-trimethylpentan-2-yl)biphenyl-2-ol)dimethyl-hafnium;
(2',2"-(propane-1,3-diylbis(oxy))bis(3-(3,6-di-tert-butyl-9H-carbazol-9-yl)-3'-methyl-5'-trifluoromethyl-5-(2,4,4-trimethylpentan-2-yl)biphenyl-2-ol)dimethyl-hafnium;
(2',2"-(2,2-dimethyl-2-silapropane-1,3-diylbis(oxy))bis(3',5'-dichloro-3-(3,6-di-tert-butyl-9H-carbazol-9-yl)-5-(2,4,4-trimethylpentan-2-yl)biphenyl-2-ol)dimethyl-hafnium;
(2',2"-(2,2-dimethyl-2-silapropane-1-diylbis(oxy))bis(5'-chloro-3-(3,6-di-tert-butyl-9H-carbazol-9-yl)-3'-methyl-5-(2,4,4 trimethylpentan-2-yl)biphenyl-2-ol)dimethyl-hafnium;
(2',2"-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol)dimethyl-hafnium;
(2',2"-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-ol)-(3",5"-dichloro-3-(3,6-di-tert-butyl-9H-carbazol-9-yl)-5-(2,4,4-trimethylpentan-2-yl)biphenyl-2-ol)dimethyl-hafnium;
(2',2"-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol)dimethyl-hafnium;
(2',2"-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;
(2',2"-(ethane-1,2-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;
(2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-zirconium;
(2',2"-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol)dimethyl-titanium; and
(2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-titanium.

According to some embodiments, the Group IV metal-ligand complex may include a constrained geometry procatalyst according to formula (XV):

Lp$_i$MX$_m$X'$_n$X"$_p$, or a dimer thereof (XV).

In formula (XV), Lp is an anionic, delocalized, π-bonded group that is bound to M, containing up to 50 non-hydrogen atoms. In some embodiments of formula (XV), two Lp groups may be joined together forming a bridged structure, and further optionally one Lp may be bound to X.

In formula (XV), M is a metal of Group 4 of the Periodic Table of the Elements in the +2, +3 or +4 formal oxidation state. X is an optional, divalent substituent of up to 50 non-hydrogen atoms that together With Lp forms a metallocycle with M. X' is an optional neutral ligand having up to 20 non hydrogen atoms; each X" is independently a monovalent, anionic moiety having up to 40 non-hydrogen atoms. Optionally, two X" groups may be covalently bound together forming a divalent dianionic moiety having both valences bound to M, or, optionally two X" groups may be covalently bound together to form a neutral, conjugated or nonconjugated diene that is π-bonded to M, in which M is in the +2 oxidation state. In other embodiments, one or more X" and one or more X' groups may be bonded together thereby forming a moiety that is both covalently bound to M and coordinated thereto by means of Lewis base functionality.

In embodiments of catalyst systems, the procatalyst may include any of the following illustrative Group IV complexes having a constrained geometry structure:

cyclopentadienyltitaniumtrimethyl;
cyclopentadienyltitaniumtriethyl;
cyclopentadienyltitaniumtriisopropyl;
cyclopentadienyltitaniumtriphenyl;
cyclopentadienyltitaniumtribenzyl;
cyclopentadienyltitanium-2,4-dimethylpentadienyl;
cyclopentadienyltitanium-2,4-dimethylpentadienyl.triethylphosphine;
cyclopentadienyltitanium-2,4-dimethylpentadienyl.trimethylphosphine;
cyclopentadienyltitaniumdimethylmethoxide;
cyclopentadienyltitaniumdimethylchloride;
pentamethylcyclopentadienyltitaniumtrimethyl;
indenyltitaniumtrimethyl;
indenyltitaniumtriethyl;
indenyltitaniumtripropyl;
indenyltitaniumtriphenyl;
tetrahydroindenyltitaniumtribenzyl;
pentamethylcyclopentadienyltitaniumtriisopropyl;
pentamethylcyclopentadienyltitaniumtribenzyl;
pentamethylcyclopentadienyltitaniumdimethylmethoxide;
pentamethylcyclopentadienyltitaniumdimethylchloride;
bis($\eta^5$-2,4-dimethylpentadienyl)titanium;
bis($\eta^5$-2,4-dimethylpentadienyl)titanium.trimethylphosphine;
bis($\eta^5$-2,4-dimethylpentadienyl)titanium.triethylphosphine;
octahydrofluorenyltitaniumtrimethyl;
tetrahydroindenyltitaniumtrimethyl;
tetrahydrofluorenyltitaniumtrimethyl;
(tert-butylamido)(1,1-dimethyl-2,3,4,9,10-η-1,4,5,6,7,8-hexahydronaphthalenyl)dimethylsilanetitaniumdimethyl;
(tert-butylamido)(1,1,2,3-tetramethyl-2,3,4,9,10-η-1,4,5,6,7,8-hexahydronaphthalenyl)dimethylsilanetitaniumdimethyl;
(tert-butylamido)(tetramethyl-$\eta^5$-cyclopentadienyl) dimethylsilanetitanium dibenzyl;
(tert-butylamido)(tetramethyl-$\eta^5$-cyclopentadienyl)dimethylsilanetitanium dimethyl;
(tert-butylamido)(tetramethyl-$\eta^5$-cyclopentadienyl)-1,2-ethanediyltitanium dimethyl;
(tert-butylamido)(tetramethyl-$\eta^5$-indenyl)dimethylsilanetitanium dimethyl;
(tert-butylamido)(tetramethyl-$\eta^5$-cyclopentadienyl)dimethylsilane titanium (III) 2-(dimethylamino)benzyl;
(tert-butylamido)(tetramethyl-$\eta^5$-cyclopentadienyl)dimethylsilanetitanium (III) allyl;
(tert-butylamido)(tetramethyl-$\eta^5$-cyclopentadienyl)dimethylsilanetitanium (III) 2,4-dimethylpentadienyl;
(tert-butylamido)(tetramethyl-$\eta^5$-cyclopentadienyl)dimethylsilanetitanium (II) 1,4-diphenyl-1,3-butadiene;
(tert-butylamido)(tetramethyl-$\eta^5$-cyclopentadienyl)dimethylsilanetitanium (II) 1,3-pentadiene;
(tert-butylamido)(2-methylindenyl)dimethylsilanetitanium (II) 1,4-diphenyl-1,3-butadiene;
(tert-butylamido)(2-methylindenyl)dimethylsilanetitanium (II) 2,4-hexadiene;
(tert-butylamido)(2-methylindenyl)dimethylsilanetitanium (IV) 2,3-dimethyl-1,3-butadiene;
(tert-butylamido)(2-methylindenyl)dimethylsilanetitanium (IV) isoprene;
(tert-butylamido)(2-methylindenyl)dimethylsilanetitanium (IV) 1,3-butadiene;
(tert-butylamido)(2,3-dimethylindenyl)dimethylsilanetitanium (IV) 2,3-dimethyl-1,3-butadiene;
(tert-butylamido)(2,3-dimethylindenyl)dimethylsilanetitanium (IV) isoprene;
(tert-butylamido)(2,3-dimethylindenyl)dimethylsilanetitanium (IV) dimethyl;
(tert-butylamido)(2,3-dimethylindenyl)dimethylsilanetitanium (IV) dibenzyl;
(tert-butylamido)(2,3-dimethylindenyl)dimethylsilanetitanium (IV) 1,3-butadiene;
(tert-butylamido)(2,3-dimethylindenyl)dimethylsilanetitanium (II) 1,3-pentadiene:
(tert-butylamido)(2,3-dimethylindenyl)dimethylsilanetitanium (II) 1,4-diphenyl-1,3-butadiene;
(tert-butylamido)(2-methylindenyl)dimethylsilanetitanium (II) 1,3-pentadiene;
(tert-butylamido)(2-methylindenyl)dimethylsilanetitanium (IV) dimethyl;
(tert-butylamido)(2-methylindenyl)dimethylsilanetitanium (IV) dibenzyl;
(tert-butylamido)(2-methyl-4-phenylindenyl)dimethylsilanetitanium (II) 1,4-diphenyl-1,3-butadiene;
(tert-butylamido)(2-methyl-4-phenylindenyl)dimethylsilanetitanium (II) 1,3-pentadiene;
(tert-butylamido)(2-methyl-4-phenylindenyl)dimethylsilanetitanium (II) 2,4-hexadiene;
(tert-butylamido)(tetramethyl-$\eta^5$-cyclopentadienyl)dimethyl-silanetitanium (IV) 1,3-butadiene;
(tert-butylamido)(tetramethyl-$\eta^5$-cyclopentadienyl)dimethylsilanetitanium (IV) 2,3-dimethyl-1,3-butadiene;
(tert-butylamido)(tetramethyl-$\eta^5$-cyclopentadienyl)dimethylsilanetitanium (IV) isoprene;
(tert-butylamido)(tetramethyl-$\eta^5$-cyclopentadienyl)dimethyl-silanetitanium (II) 1,4-dibenzyl-1,3-butadiene;
(tert-butylamido)(tetramethyl-$\eta^5$-cyclopentadienyl)dimethylsilanetitanium (II) 2,4-hexadiene;
(tert-butylamido)(tetramethyl-$\eta^5$-cyclopentadienyl)dimethyl-silanetitanium (II) 3-methyl-1,3-pentadiene;
(tert-butylamido)(2,4-dimethylpentadien-3-yl)dimethylsilanetitaniumdimethyl;
(tert-butylamido)(6,6-dimethylcyclohexadienyl)dimethylsilanetitaniumdimethyl;
(tert-butylamido)(1,1-dimethyl-2,3,4,9,10-η-1,4,5,6,7,8-hexahydronaphthalen-4yl)dimethylsilanetitaniumdimethyl;
(tert-butylamido)(1,1,2,3-tetramethyl-2,3,4,9,10-η-1,4,5,6,7,8-hexahydronaphthalen-4-yl)dimethylsilanetitaniumdimethyl;
(tert-butylamido)(tetramethyl-$\eta^5$-cyclopentadienyl methylphenylsilanetitanium (IV) dimethyl;
(tert-butylamido)(tetramethyl-$\eta^5$-cyclopentadienyl methylphenylsilanetitanium (II) 1,4-diphenyl-1,3-butadiene;
1-(tert-butylamido)-2-(tetramethyl-$\eta^5$-cyclopentadienyl) ethanediyltitanium (IV) dimethyl;

1-(tert-butylamido)-2-(tetramethyl-η$^5$-cyclopentadienyl) ethanediyl-titanium (II) 1,4-diphenyl-1,3-butadiene;

Other catalysts, especially catalysts containing other Group IV metal-ligand complexes, will be apparent to those skilled in the art.

The catalyst systems of this disclosure may include co-catalysts or activators in addition to the activator of formula (I). Such additional co-catalysts may include, for example, tri(hydrocarbyl)aluminum compounds having from 1 to 10 carbons in each hydrocarbyl group, an oligomeric or polymeric alumoxane compound, di(hydrocarbyl)(hydrocarbyloxy)aluminum compound having from 1 to 20 carbons in each hydrocarbyl or hydrocarbyloxy group, or mixtures of the foregoing compounds. These aluminum compounds are usefully employed for their beneficial ability to scavenge impurities such as oxygen, water, and aldehydes from the polymerization mixture.

The di(hydrocarbyl)(hydrocarbyloxy)aluminum compounds that may be used in conjunction with the activators described in this disclosure correspond to the formula $T^1{}_2AlOT^2$ or $T_1Al(OT^2)_2$ wherein $T^1$ is a secondary or tertiary $(C_3-C_6)$alkyl, such as isopropyl, isobutyl or tert-butyl; and $T^2$ is a alkyl substituted $(C_6-C_{30})$aryl radical or aryl substituted $(C_1-C_{30})$alkyl radical, such as 2,6-di(tert-butyl)-4-methylphenyl, 2,6-di(tert-butyl)-4-methylphenyl, 2,6-di(tert-butyl)-4-methyltolyl, or 4-(3',5'-di-tert-butyltolyl)-2,6-di-tert-butylphenyl.

Additional examples of aluminum compounds include $[C_6]$trialkyl aluminum compounds, especially those wherein the alkyl groups are ethyl, propyl, isopropyl, n-butyl, isobutyl, pentyl, neopentyl, or isopentyl, dialkyl(aryloxy) aluminum compounds containing from 1 to 6 carbons in the alkyl group and from 6 to 18 carbons in the aryl group (especially (3,5-di(t-butyl)-4-methylphenoxy)diisobutylaluminum), methylalumoxane, modified methylalumoxane and diisobutylalumoxane.

In the catalyst systems according to embodiments of this disclosure, the molar ratio of the activator to Group IV metal-ligand complex may be from 1:10.000 to 1000:1, such as, for example, from 1:5000 to 100:1, from 1:100 to 100:1 from 1:10 to 10:1, from 1:5 to 1:1, or from 1.25:1 to 1:1. The catalyst systems may include combinations of one or more activator described in this disclosure.

Polyolefins

According to some embodiments, processes of polymerizing olefins include contacting ethylene and a $(C_3-C_{40})$ alpha-olefin comonomer in the presence of a catalyst system that includes a Group IV metal-ligand complex and an activator having the structure according to formula (I).

The catalytic systems described in the preceding paragraphs are utilized in the polymerization of olefins, primarily ethylene and propylene. In some embodiments, the polymerization process includes a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, 4-methyl-1-pentene, 5-ethyldiene-2-norbornene, and 5-vinyl-2-norbornene. For example, the one or more α-olefin co-monomers may be selected from the group consisting of propylene, 1-butene, 1-hexene, and 1-octene; or in the alternative, from the group consisting of 1-hexene and 1-octene.

The ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mol %" are disclosed herein as separate embodiments; for example, the ethylene-based polymers, homopolymers and/or interpolymers (including copolymers) of ethylene and optionally one or more co-monomers such as α-olefins may comprise at least 60 mol % monomer units derived from ethylene; at least 70 mol % monomer units derived from ethylene; at least 80 mol % monomer units derived from ethylene; or from 50 to 100 mol % monomer units derived from ethylene; or from 80 to 100 mol % units derived from ethylene.

In some embodiments, the ethylene-based polymers may comprise at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene-based polymer, the amount of additional α-olefin is less than 50%; other embodiments include at least 0.5 mol % to 25 mol %; and in further embodiments the amount of additional α-olefin includes at least 5 mol % to 10 mol %. In some embodiments, the additional α-olefin is 1-octene.

Any conventional polymerization processes may be employed to produce the ethylene-based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the polymerization process may include a solution polymerization in a single reactor system, for example a single loop reactor system, in which ethylene and optionally one or more α-olefins are polymerized in the presence of the catalyst system, as described within this disclosure, and optionally one or more co-catalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids, IV stabilizers, and combinations thereof. The ethylene-based polymers may contain any amounts of additives. The ethylene-based polymers may compromise from about 0 to about 10 percent by the combined weight of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend.

Batch Reactor Procedure

Batch reactor experiments are performed in a continuous stirred tank reactor (1 gallon capacity reactor for Table 1, 2 L capacity reactor for Tables 2-4). The reactor is loaded with Isopar-E hydrocarbon solvent, hydrogen, and the appropriate amount of octene comonomer before being heated to the specified temperature and pressurized with ethylene to the specified psi. When the reactor is at pressure, the polymerization is initiated by adding an activated catalyst solution consisting of the catalyst, co-catalyst, and triethylaluminum scavenger. Polymerization is allowed to proceed for 10 minutes while maintaining reactor temperature and pressure. After the reaction is completed, the polymer was collected and dried in a vacuum oven overnight before being analyzed.

EXAMPLES

Examples 1 to 22 are synthetic procedures for intermediates of activators, the cations of the activators, the comparative activators, and for activators themselves. Example 23 provides polymerization results. One or more features of the present disclosure are illustrated in view of the examples as follows:

Example 1—Synthesis of Bis[6,6'-(((2-(dimethylamino)ethyl)azanediyl)bis(methylene))bis(2,4-di-tert-butylphenol)]yttrium

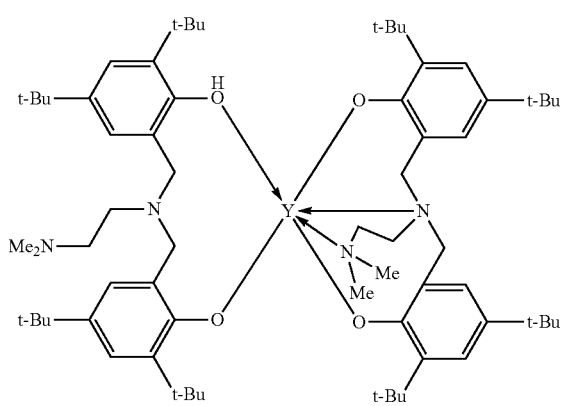

Based upon literature reference Clark, L.; Cushion, M. G.; Dyer, H. E.; Schwarz, A. D.; Duchateau, R.; Mountford, P. *Chem. Commun* 2010, 46, 273. In a nitrogen-filled glovebox, a solution of 6,6'-(((2-(dimethylamino)ethyl)azanediyl)bis(methylene))bis(2,4-di-tert-butylphenol) (1.03 g, 1.96 mmol, 2.0 equiv.) in toluene (10 mL) was added to a vial containing tris(bis(trimethylsilyl)amino)yttrium (0.560 g, 0.982 mmol, 1 equiv.). The 6,6'-(((2-(dimethylamino)ethyl)azanediyl)bis(methylene))bis(2,4-di-tert-butylphenol) vial was rinsed with additional toluene (2×10 mL), and this was added to the reaction. The reaction was stirred at room temperature for 16 h. The solution was clear. The solution was passed through a 0.45 µm syringe filter and concentrated in vacuo. A clear, viscous oil was obtained. Hexane (15 mL) was added, yielding a clear solution. However, while mixing, it became cloudy. The hazy solution was passed through a 0.45 µm syringe filter. The filter was rinsed with additional hexane (5 mL). The hexane solution was stored in a −30° C. freezer for 3 days. Only a small amount of material precipitated from solution. All volatiles were removed in vacuo. The solid was triturated with hexane (15 mL) for 30 min. The solid was filtered, washed with hexane (3×2 mL), and dried in vacuo, yielding an off-white powder (0.675 g, 61% yield).

$^1$H NMR (400 MHz, Benzene-$d_6$) δ 8.70 (br s, 1H), 7.62 (d, J=2.5 Hz, 1H), 7.60 (d, J=2.6 Hz, 1H), 7.48 (d, J=2.5 Hz, 1H), 7.41 (d, J=2.5 Hz, 1H), 7.08-7.02 (m, 2H), 7.00 (d, J=2.5 Hz, 1H), 6.93 (d, J=2.5 Hz, 1H), 6.67 (d, J=2.4 Hz, 1H), 6.59 (d, J=11.2 Hz, 1H), 4.58 (d, J=13.1 Hz, 1H), 4.27 (d, J=12.3 Hz, 1H), 3.24 (t, J=10.8 Hz, 1H), 3.02-2.78 (m, 3H), 2.70 (d, J=12.2 Hz, 1H), 1.84 (s, 9H), 1.72 (s, 9H), 1.63 (s, 9H), 1.48 (s, 9H), 1.42 (s, 9H), 1.41 (s, 9H), 1.40 (s, 12H), 1.31 (s, 9H), 1.26 (s, 9H). $^{13}$C NMR (101 MHz, Benzene-$d_6$) δ 162.89 (d, $J_{Y-C}$=1.7 Hz), 162.43 (d, $J_{Y-C}$=4.6 Hz), 162.26 (d, $J_{Y-C}$=2.8 Hz), 162.07 (d, $J_{Y-C}$=4.3 Hz), 139.10, 138.42, 136.72, 136.67, 136.09, 135.84, 135.59, 134.12, 126.81, 126.17, 125.92, 125.84, 125.22, 124.89, 124.62, 124.58, 124.44, 124.02, 120.40, 65.62, 64.29, 62.90, 62.31, 60.25, 55.33, 51.05, 47.63, 44.30, 35.80, 35.56, 35.52, 35.43, 34.55, 33.79, 33.77, 33.65, 31.94, 31.88, 31.83, 31.58, 31.56, 31.38, 30.88, 30.65.

Example 2—Synthesis of Potassium Bis[6,6'-(((2-(dimethylamino)ethyl)azanediyl)bis(methylene))bis(2,4-di-tert-butylphenol)]yttrium, Comparative C2 Percursor

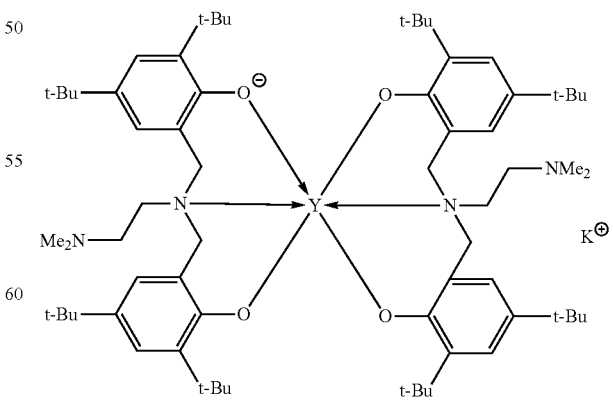

In a nitrogen-filled glovebox, a reaction jar was charged with bis[6,6'-(((2-(dimethylamino)ethyl)azanediyl)bis (methylene))bis(2,4-di-tert-butylphenol)]yttrium (0.300 g, 0.264 mmol, 1 equiv.) and toluene (5 mL). A solution of KHMDS (52.7 mg, 0.264 mmol, 1 equiv.) in toluene (5 mL) was added dropwise to the yttrium solution. The KHMDS vial was rinsed with toluene (2.5 mL) and added to the yttrium solution. The reaction was stirred at room temperature for 45 min, yielding a clear solution. All volatiles were removed in vacuo to yield a white powder (0.327 g). The material was only sparingly soluble in benzene-$d_6$. NMR showed residual H-HMDS and toluene. The contents of the NMR tube were transferred back to the reaction. The solid was triturated with hexane (10 mL) for 30 min. All volatiles were removed in vacuo, yielding a white solid (0.305 g, 98% yield).

$^1$H NMR (400 MHz, Benzene-$d_6$) δ 7.40 (d, J=2.3 Hz, 2H), 7.38 (d, J=2.3 Hz, 2H), 7.24 (d, J=2.3 Hz, 2H), 7.21 (d, J=2.3 Hz, 2H), 4.58 (d, J=12.1 Hz, 2H), 3.84 (d, J=12.4 Hz, 2H), 3.54 (d, J=12.2 Hz, 2H), 3.46 (d, J=12.5 Hz, 2H), 3.26-3.12 (m, 2H), 2.89-2.69 (m, 4H), 2.62 (dt, J=11.0, 5.4 Hz, 2H), 2.10 (s, 12H), 1.41 (s, 18H), 1.40 (s, 18H), 1.38 (s, 18H), 1.33 (s, 18H). $^{13}$C NMR (101 MHz, Benzene-$d_6$) δ 162.21 (d, $J_{Y-C}$=2.7 Hz), 160.56 (d, $J_{Y-C}$=1.4 Hz), 136.71, 136.62, 135.75, 134.43, 126.90, 125.10, 123.72, 123.52, 123.44, 121.77, 60.45, 60.00, 49.80, 45.98, 43.45, 35.09, 34.88, 33.83, 33.76, 31.88, 31.68, 30.08, 30.00.

Example 3—Synthesis of Dimethylanilinium Chloride

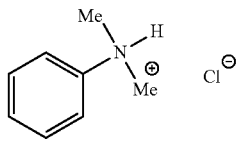

In a nitrogen-filled glovebox, dimethylaniline (10 mL, 78.9 mmol, 1 equiv.) was dissolved in hexane (60 mL). A 2 M solution of HCl in diethyl ether (39.4 mL, 78.9 mmol, 1 equiv.) was added dropwise to the stirring dimethylaniline solution, resulting in the immediate precipitation of a white solid. The suspension was filtered, washed with hexane (3×20 mL), and dried in vacuo to afford the product as a white solid (7570-A, 6.017 g, 48% yield). A significant amount of material stuck to the walls of the jar; scraping off was not attempted.

$^1$H NMR (400 MHz, Chloroform-d) δ 14.37 (br s, 1H), 7.75 (d, J=7.3 Hz, 2H), 7.49-7.37 (m, 3H), 3.14 (s, 6H). $^{13}$C NMR (101 MHz, Chloroform-d) δ 142.85, 130.45, 130.15, 120.73, 46.51.

Example 4—Synthesis of N-methyl-dioctylaminium Chloride

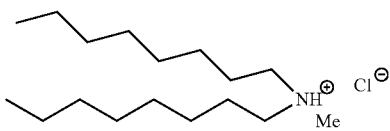 [SMILES: CCCCCCCC[NH2+]CCCCCCCC ; [Cl-]]

In a nitrogen-filled glovebox, N-methyl-dioctylamine (7.0 mL, 21.7 mmol, 1 equiv.) was dissolved in hexane (100 mL). A 2 M solution of HCl in diethyl ether (10.9 mL, 21.7 mmol, 1 equiv.) was slowly added dropwise to the stirring amine solution, resulting in the immediate precipitation of a white solid. The suspension was stirred at room temperature for 45 min. The suspension was filtered, washed with hexane (3×20 mL), and dried in vacuo to afford the product as an off-white solid (6.02 g, 95% yield). The solid initially agglomerated as a solid, waxy chunk upon initial drying. However, it was able to be pulverized into a free-flowing powder.

$^1$H NMR (400 MHz, Chloroform-d) δ 11.85 (br s, 1H), 2.92 (tq, J=9.6, 4.7 Hz, 2H), 2.82 (tt, J=11.8, 5.4 Hz, 2H), 2.65 (d, J=5.0 Hz, 3H), 1.83-1.61 (m, 4H), 1.29-1.08 (m, 20H), 0.76 (t, J=6.7 Hz, 6H). $^{13}$C NMR (101 MHz, Chloroform-d) δ 55.62, 39.65, 31.52, 28.90, 28.87, 26.66, 23.53, 22.43, 13.93.

Example 5—Synthesis of Armeenium M2HT Chloride

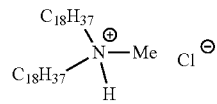

In a nitrogen-filled glovebox, Armeen M2HT (5.36 g, 10.0 mmol, 1 equiv.) was dissolved in hexane (150 mL). A 2 M solution of HCl in diethyl ether (5.0 mL, 10.0 mmol, 1 equiv.) was slowly added dropwise to the stirring amine solution, resulting in the immediate precipitation of a white solid. The suspension was stirred at room temperature for 15 min. The precipitated solid was voluminous and fine, producing a thick gel-like suspension. Filtration of the suspension was attempted; however, it did not pass through the filter. The suspension was transferred back into a glass jar and dried in vacuo to yield a white solid (4.76 g, 83% yield).

$^1$H NMR (400 MHz, Toluene-$d_8$) δ 13.02-12.71 (m, 1H), 2.90 (dtd, J=43.2, 12.4, 6.8 Hz, 4H), 2.67 (d, J=4.7 Hz, 3H), 1.72 (ddt, J=50.3, 13.3, 6.7 Hz, 4H), 1.32 (d, J=22.5 Hz, 60H), 0.91 (t, J=6.6 Hz, 6H). $^{13}$C NMR (101 MHz, Toluene-$d_8$) δ 54.75, 39.08, 32.03, 30.00, 29.98, 29.95, 29.92, 29.86, 29.53, 29.48, 27.04, 23.62, 22.77, 13.96.

Example 6—Synthesis of 2-methyl-N-(tri(pyrrolidin-1-yl)-$\lambda^5$-phosphanylidene)propan-2-aminium Chloride (C-P1 Cation)

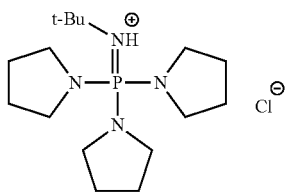 [SMILES: CC(C)(C)[NH+]=P(N1CCCC1)(N1CCCC1)N1CCCC1 ; [Cl-]]

In a nitrogen-filled glovebox, N-tert-butyl-1,1,1-tri(pyrrolidin-1-yl)-$\lambda^5$-phosphanimine (5.0 mL, 16.4 mmol, 1 equiv.) was dissolved in hexane (100 mL). A 2 M solution of HCl in diethyl ether (8.2 mL, 16.4 mmol, 1 equiv.) was slowly added dropwise to the stirring amine solution. Immediately, a white solid precipitated from solution. During the addition, some of the solids agglomerated on the bottom as a slightly sticky off-white layer. The reaction was stirred at room temperature for 30 min. The walls of the flask were scraped to loosen the solids. The solid was filtered, washed with hexane (3×20 m), and dried in vacuo to afford the product as an off-white solid (4.20 g, 74% yield). $^1$H NMR (400 MHz, Chloroform-d) δ 6.40 (br s, 1H), 3.24-3.17 (m, 12H), 1.84-1.78 (m, 12H), 1.28 (d, $J_{P-H}$=0.9 Hz, 9H). $^{13}$C NMR (101 MHz, Chloroform-d) δ 52.44 (d, $J_{P-C}$=1.8 Hz), 47.63 (d, $J_{P-C}$=4.8 Hz), 31.43 (d, $J_{P-C}$=4.6 Hz), 26.05 (d, $J_{P-C}$=8.2 Hz). $^{31}$P NMR (162 MHz, Chloroform-d) δ 22.21.

Example 7—Synthesis of N-(bis(dimethylamino) methylene)-2-methylpropan-2-aminium Chloride

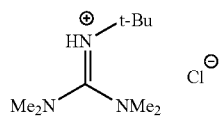

In a nitrogen-filled glovebox, 2-(tert-butyl)-1,1,3,3-tetramethylguanidine (5.0 mL, 16.4 mmol, 1 equiv.) was dissolved in hexane (100 mL). A 2 M solution of HCl in diethyl ether (8.2 mL, 16.4 mmol, 1 equiv.) was slowly added dropwise to the stirring amine solution. Immediately, a white solid precipitated from solution. During the addition, some of the solids agglomerated on the bottom as a slightly sticky off-white layer. The reaction was stirred at room temperature for 30 min. The walls of the flask were scraped to loosen the solids. The solid was filtered, washed with hexane (3×20 mL), and dried in vacuo to afford the product as a white solid (4.00 g, 82% yield). $^1$H NMR (400 MHz, Chloroform-d) δ 8.82 (br s, 1H), 3.21 (br s, 3H), 2.84 (br s, 9H), 1.34 (s, 9H). $^{13}$C NMR (101 MHz, Chloroform-d) δ 160.83, 56.58, 41.07 (br), 29.77.

Example 8—Synthesis of Comparative C1, 2-methyl-N-(tri(pyrrolidin-1-yl)-.$^5$-phosphanylidene) propan-2-aminium bis[6,6'-(((2-(dimethylamino) ethyl)azanediyl)bis(methylene))bis(2,4-di-tert-butylphenol)]yttrium

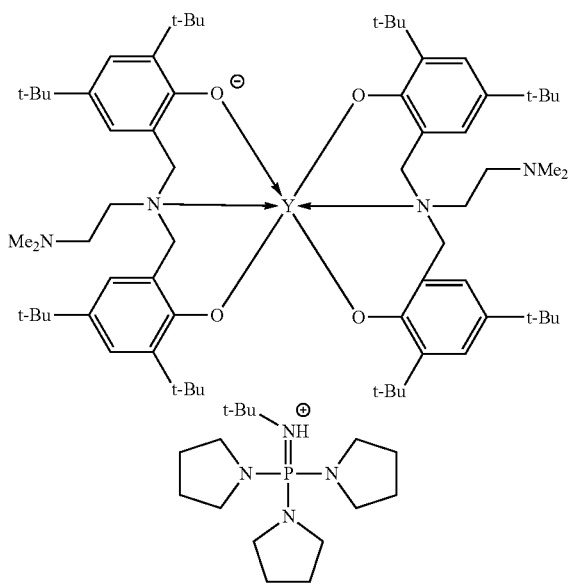

In a nitrogen-filled glovebox, a solution of a 2-methyl-N-(tri(pyrrolidin-1-yl)-λ$^5$-phosphanylidene)propan-2-aminium chloride (53.7 mg, 0.154 mmol, 1 equiv.) in toluene (5 mL) was added to a reaction vial containing potassium bis[6,6'-(((2-(dimethylamino)ethyl)azanediyl)bis(methylene))bis(2,4-di-tert-butylphenol)]yttrium (180.5 mg, 0.154 mmol, 1 equiv.). The 2-methyl-N-(tri(pyrrolidin-1-yl)-λ$^5$-phosphanylidene)propan-2-aminium chloride vial was rinsed with toluene (2×2.5 mL), and this was added to the reaction. The reaction was stirred at room temperature for 1 h, yielding a clear solution. The solution was passed through a 0.45 μm syringe filter in line with a 0.2 μm syringe filter. The vial and syringe filters were washed with additional toluene (1 mL). All volatiles were removed in vacuo, yielding a thick clear oil. The oil was dissolved in toluene (1 mL). Hexane (5 mL) was added, yielding a hazy solution. All volatiles were removed in vacuo. The thick oil was triturated with hexane (10 mL) and concentrated in vacuo. This process was repeated a second time. A clear, sticky semisolid was obtained (248.8 mg). The material is 90% pure, with the remaining material consisting of residual solvent $^1$H NMR (400 MHz, Benzene-d$_6$) δ 7.37 (d, J=2.6 Hz, 2H), 7.36 (d, J=2.6 Hz, 2H), 7.28 (d, J=2.5 Hz, 2H), 7.18 (d, J=2.5 Hz, 2H), 4.94 (d, J=12.0 Hz, 2H), 4.89 (d, J=12.1 Hz, 2H), 3.67 (d, J=12.1 Hz, 2H), 3.56 (d, J=12.3 Hz, 2H), 3.37-3.23 (m, 2H), 3.07-2.98 (m, 2H), 2.88 (td, J=11.0, 4.1 Hz, 2H), 2.72 (td, J=11.0, 4.4 Hz, 2H), 2.30-2.20 (m, 12H), 2.12 (s, 12H), 1.73 (s, 18H), 1.51 (s, 18H), 1.45 (s, 18H), 1.45 (s, 18H), 1.29-1.24 (m, 12H), 0.71 (br s, 9H). $^{13}$C NMR (101 MHz, Benzene-d$_6$) δ 163.78 (d, $J_{Y-C}$=2.3 Hz), 163.67 (d, $J_{Y-C}$=2.3 Hz), 135.18, 135.12, 132.37, 132.32, 125.80, 125.13, 123.75, 122.68, 122.58, 122.29, 60.30, 60.12, 50.02, 47.03 (d, $J_{P-C}$=4.5 Hz), 45.74, 42.48, 35.21, 35.09, 33.80, 32.21, 32.14, 30.89 (br), 30.42, 30.21, 25.67 (d, $J_{P-C}$=7.8 Hz). $^{31}$P NMR (162 MHz, Benzene-d$_6$) δ 20.47.

Example 9—Synthesis of Comparative C 2, N-(bis (dimethylamino)methylene)-2-methylpropan-2-aminium bis[6,6'-(((2-(dimethylamino)ethyl)azanediyl) bis(methylene))bis(2,4-di-tert-butylphenol)]yttrium

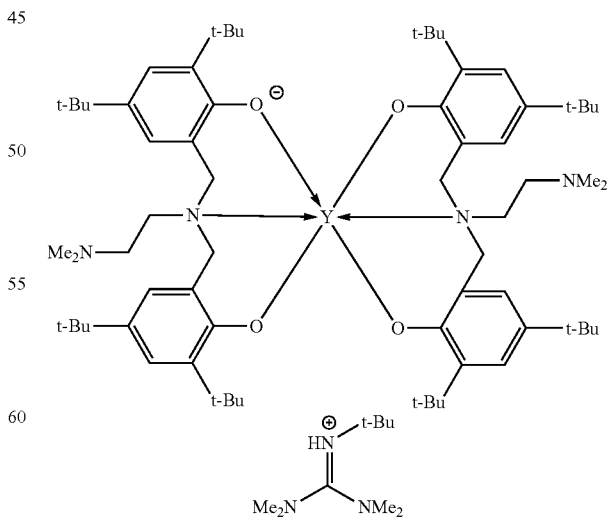

In a nitrogen-filled glovebox, a reaction vial was charged with potassium bis[6,6'-(((2-(dimethylamino)ethyl)

azanediyl)bis(methylene))bis(2,4-di-tert-butylphenol)]yttrium (200 mg, 0.171 mmol, 1 equiv.) and N-(bis(dimethylamino)methylene)-2-methylpropan-2-aminium chloride (35.4 mg, 0.171 mmol, 1 equiv.). Toluene (10 mL) was added, and the reaction was stirred at room temperature for 1.5 h, yielding a clear solution. The solution was passed through a 0.45 μm syringe filter in line with a 0.2 μm syringe filter. The vial and syringe filters were washed with additional toluene (1 mL). All volatiles were removed in vacuo, yielding a thick clear oil. The oil was dissolved in toluene (1 mL). Hexane (5 mL) was added, yielding a hazy solution. Additional hexane (5 mL) was added. All volatiles were removed in vacuo, yielding a clear sticky solid with some white precipitate. The material was triturated with hexane (10 mL). Once again, all volatiles were removed in vacuo, yielding a white solid with only a small amount of clear, sticky material. Trituration with hexane (10 mL) followed by drying in vacuo was repeated again to afford the product as a white solid (0.2096 g, 94% yield).

$^1$H NMR (400 MHz, Benzene-$d_6$) δ 7.40 (d, J=2.6 Hz, 2H), 7.33 (d, J=2.6 Hz, 2H), 7.27 (d, J=2.5 Hz, 2H), 7.15 (d, J=2.5 Hz, 2H), 4.82 (d, J=12.0 Hz, 2H), 4.67 (d, J=12.3 Hz, 2H), 3.64 (d, J=12.0 Hz, 2H), 3.53 (d, J=12.4 Hz, 2H), 3.29 (td, J=13.1, 3.9 Hz, 2H), 3.02-2.91 (m, 2H), 2.87 (td, J=10.9, 4.0 Hz, 2H), 2.66 (td, J=10.9, 4.0 Hz, 2H), 2.10 (s, 12H), 1.83 (s, 12H), 1.65 (s, 18H), 1.49 (s, 18H), 1.44 (s, 18H), 1.42 (s, 18H), 0.46 (s, 9H). $^{13}$C NMR (101 MHz, Benzene-$d_6$) δ 163.51 (d, $J_{Y-C}$=2.3 Hz), 163.40 (d, $J_{Y-C}$=2.4 Hz), 163.52, 163.49, 163.41, 163.38, 159.01, 135.60, 135.37, 132.99, 132.88, 125.89, 125.04, 123.76, 123.06, 122.65, 122.17, 60.03, 55.75, 49.92, 45.58, 42.34, 39.38, 35.18, 35.07, 33.80, 33.78, 32.14, 32.08, 30.30, 30.03, 29.02. HRMS (ESI) Calculated for $C_9H_{22}N_3$[M$^+$]: 172.1808; found 172.1806. Calculated for $C_{68}H_{108}N_4O_4Y$ [M$^-$]: 1133.7435; found 1133.7470

Example 10—Synthesis of Comparative C5, 2-methyl-N-(tri(pyrrolidin-1-yl)-$\lambda^5$-phosphanylidene)propan-2-aminium tetrakis(pentafluorophenyl)borate

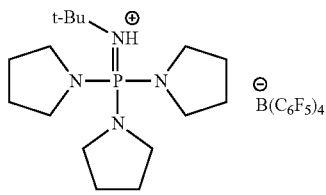 [SMILES: "B(C6F5)4" ; CC(C)(C)[NH+]=P(N1CCCC1)(N1CCCC1)N1CCCC1]

In a nitrogen-filled glovebox, a solution of a 2-methyl-N-(tri(pyrrolidin-1-yl)-$\lambda^5$-phosphanylidene)propan-2-aminium chloride (48.6 mg, 0.140 mmol, 1 equiv.) in dichloromethane (5 mL) was added to a reaction vial containing potassium tetrakis(pentafluorophenyl)borate (100 mg, 0.140 mmol, 1 equiv.). The 2-methyl-N-(tri(pyrrolidin-1-yl)-$\lambda^5$-phosphanylidene)propan-2-aminium chloride vial was rinsed with dichloromethane (2×2.5 mL), and this was added to the reaction. The reaction was stirred at room temperature for 24 h, yielding a hazy solution. The solution was passed through a 0.45 μm syringe filter, affording a clear solution. The solution was concentrated in vacuo to yield an off-white powder. Toluene (10 mL) was added and the suspension was stirred for 5 minutes. Little material dissolved; the product appears insoluble in toluene. All volatiles were removed in vacuo. Hexane (10 mL) was added, the solid was triturated, and all volatiles were removed in vacuo, yielding the product as an off-white solid (0.1311 g, 95% yield).

$^1$H NMR (400 MHz, Chloroform-d) δ 3.15 (td, J=6.7, 3.9 Hz, 12H), 2.54 (d, $J_{P-H}$=10.8 Hz, 1H), 1.95-1.83 (m, 12H), 1.28 (d, $J_{P-H}$=0.9 Hz, 9H). $^{13}$C NMR (101 MHz, Chloroform-d) δ (Several broad resonances centered around 149.34, 146.91, 139.32, 137.38, 136.88, 134.94, 123.74, due to C—F and C—B coupling), 52.91, 47.67 (d, $J_{P-C}$=4.6 Hz), 31.22 (d, $J_{P-C}$=4.0 Hz), 25.99 (d, $J_{P-C}$=8.3 Hz). $^{19}$F NMR (376 MHz, Chloroform-d) δ −132.63 (d, J=12.6 Hz), −163.20 (t, J=20.5 Hz), −167.00 (t, J=18.2 Hz). $^{31}$P NMR (162 MHz, Chloroform-d) δ 21.20. $^{11}$B NMR (128 MHz, Chloroform-d) δ −16.70. HRMS (ESI) Calculated for $C_{16}H_{34}N_4P$ [M$^+$]: 313.2516; found 313.2516. Calculated for $C_{24}BF_{20}$ [M$^-$]: 678.9779; found 678.9756.

Example 11—Synthesis of Comparative C6, N-(bis(dimethylamino)methylene)-2-methylpropan-2-aminium tetrakis(pentafluorophenyl)borate

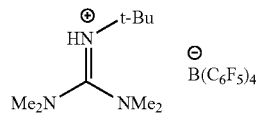

In a nitrogen-filled glovebox, a solution of a N-(bis(dimethylamino)methylene)-2-methylpropan-2-aminium chloride (28.9 mg, 0.140 mmol, 1 equiv.) in dichloromethane (5 mL) was added to a reaction vial containing potassium tetrakis(pentafluorophenyl)borate (100 mg, 0.140 mmol, 1 equiv.). The N-(bis(dimethylamino)methylene)-2-methylpropan-2-aminium chloride vial was rinsed with dichloromethane (2×2.5 mL), and this was added to the reaction. The reaction was stirred at room temperature for 2 h, yielding a hazy solution. The solution was passed through a 0.45 μm syringe filter, affording a clear solution. The solution was concentrated in vacuo to yield an off-white powder. Toluene (10 mL) was added and the suspension was stirred for a few minutes. All volatiles were removed in vacuo. The solid was triturated with hexane (10 mL). All volatiles were removed in vacuo, yielding the product as an off-white powder (0.112 g, 94% yield).

$^1$H NMR (400 MHz, Chloroform-d) δ 4.29 (br s, 1H), 2.94 (s, 12H), 1.34 (s, 9H). $^{19}$F NMR (376 MHz, Chloroform-d) δ −132.72 (d, J=7.6 Hz), −162.75 (t, J=20.5 Hz), −166.80 (t, J=18.2 Hz). $^{11}$B NMR (128 MHz, Chloroform-d) δ −16.71. HRMS (ESI) Calculated for $C_9H_{22}N_3$ [M$^+$]: 172.1808; found 172.1809. Calculated for $C_{24}BF_{20}$ [M$^-$]: 678.9779; found 678.9774.

Example 12—Synthesis of 6,6'-((methylazanediyl)bis(methylene))bis(2,4-di-tert-butylphenol)

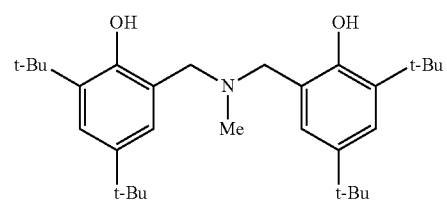 [SMILES: CN(Cc1cc(C(C)(C)C)cc(C(C)(C)C)c1O)Cc1cc(C(C)(C)C)cc(C(C)(C)C)c1O]

A 100 mL round bottom flask was charged with paraformaldehyde (1.03 g, 34.4 mmol, 2 equiv.), potassium hydroxide (10 mg, 0.172 mmol, 1 mol %), and methanol (5 mL). The solution was cooled in an ice bath. A 40% w/w aqueous solution of methylamine (1.48 mL, 17.2 mmol, 1 equiv.) was added dropwise to the methanol solution. The ice bath was removed and the reaction was allow to warm to room temperature. A solution of 2,4-di-tert-butylphenol (7.10 g, 34.4 mmol, 2 equiv.) in methanol (3 mL) was added to the reaction. The phenol vial was rinsed with methanol (2 mL) and this was added to the reaction. The mixture was stirred at reflux for 24 h. Some solid material precipitated from the solution. All volatiles were removed in vacuo, yielding a foamy solid with some thick, viscous oil. The material was attempted to be recrystallized from toluene, however very little material crashed out of solution. The material was adsorbed onto silica gel and purified by flash column chromatography (ISCO, 220 g silica gel, 1-4% EtOAc in hexane). The material initially was a thick oil, but upon drying in vacuo it foamed up significantly. The product was isolated as a white solid (5.49 g). The bulk material was recrystallized from hexane. Some heating was required to get all material to dissolve. A white solid was obtained (3.8113 g, 48% yield).

$^1$H NMR (400 MHz, Chloroform-d) δ 7.84 (br s, 2H), 7.24 (d, J=2.4 Hz, 2H), 6.92 (d, J=2.4 Hz, 2H), 3.64 (s, 4H), 2.32 (s, 3H), 1.41 (s, 18H), 1.28 (s, 18H). $^{13}$C NMR (101 MHz, Chloroform-d) δ 152.42, 141.51, 136.02, 124.89, 123.55, 121.56, 59.99, 42.03, 34.85, 34.15, 31.62, 29.71. HRMS (ESI) Calculated for $C_{31}H_{49}NO_2$ [M+1]: 468.3836; found 468.3792.

Example 13—Synthesis of Precursor of Comparative C3 and C4, Potassium Bis[6,6'-((methylazanediyl)bis(methylene))bis(2,4-di-tert-butylphenol)]yttrium

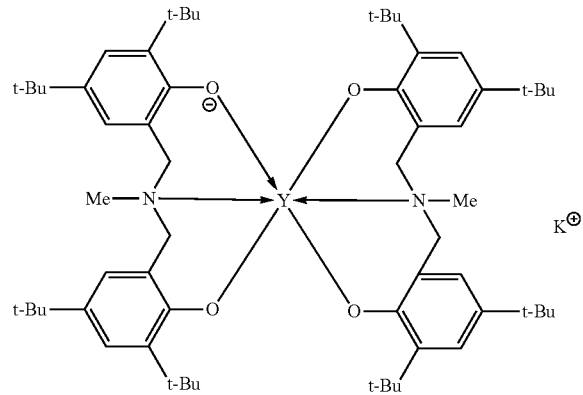

In a nitrogen-filled glovebox, a solution of 6,6'-((methylazanediyl)bis(methylene))bis(2,4-di-tert-butylphenol) (1.00 g, 2.14 mmol, 2 equiv.) in toluene (20 mL) was added to a reaction jar containing tris(bis(trimethylsilyl)amino)yttrium (0.609 g, 1.07 mmol, 1 equiv.) and toluene (20 mL). The 6,6'-((methylazanediyl)bis(methylene))bis(2,4-di-tert-butylphenol) vial was rinsed with additional toluene (2×10 mL), and this was added to the reaction. The reaction was stirred at room temperature for 1.5 h. All volatiles were removed in vacuo, yielding a white solid. The solid was dissolved in toluene (10 mL). Not all material went into solution initially. A solution of KHMDS (0.213 g, 1.07 mmol, 1 equiv.) in toluene (10 mL) was added. The vial containing the KHMDS solution was rinsed with additional toluene (2×5 mL), and this was added to the reaction. The clear solution was stirred at room temperature for 4 h. After 5 min, all material dissolved into a clear solution. After 15 minutes of stirring the solution became slightly turbid, and by 1 h of stirring a large amount of white precipitate formed. All volatiles were removed in vacuo. The material was triturated with hexane (30 mL). The sample was further dried in vacuo at 40° C. for 18 h, affording a white solid (1.16 g, quantitative yield).

$^1$H NMR (400 MHz, Methylene Chloride-d$_2$) δ 7.27 (d, J=2.1 Hz, 2H), 7.06 (d, J=2.3 Hz, 2H), 6.99 (d, J=2.3 Hz, 2H), 6.84 (d, J=2.1 Hz, 2H), 4.52 (d, J=12.0 Hz, 2H), 4.44 (d, J=12.6 Hz, 2H), 3.12 (d, J=12.7 Hz, 2H), 2.91 (d, J=12.0 Hz, 2H), 2.01 (s, 6H), 1.47 (s, 18H), 1.30 (s, 18H), 1.24 (s, 18H), 0.93 (s, 18H). $^{13}$C NMR (101 MHz, Methylene Chloride-d$_2$) δ 161.89 (d, $J_{Y-C}$=2.2 Hz), 160.02 (d, $J_{Y-C}$=1.3 Hz), 136.89, 136.47, 134.92, 134.51, 126.60, 125.24, 124.26, 123.25, 122.44, 65.08, 64.98, 39.02, 35.11, 34.36, 33.82, 33.56, 31.55, 31.50, 29.81, 29.17. HRMS (ESI) Calculated for $C_{62}H_{94}N_2O_4Y$ [M$^-$] 1019.6278; found 1019.6316.

Example 14—Synthesis of Comparative C3, 2-methyl-N-(tri(pyrrolidin-1-yl)-λ$^5$-phosphanylidene)propan-2-aminium Bis[6,6'-((methylazanediyl)bis(methylene))bis(2,4-di-tert-butylphenol)]yttrium

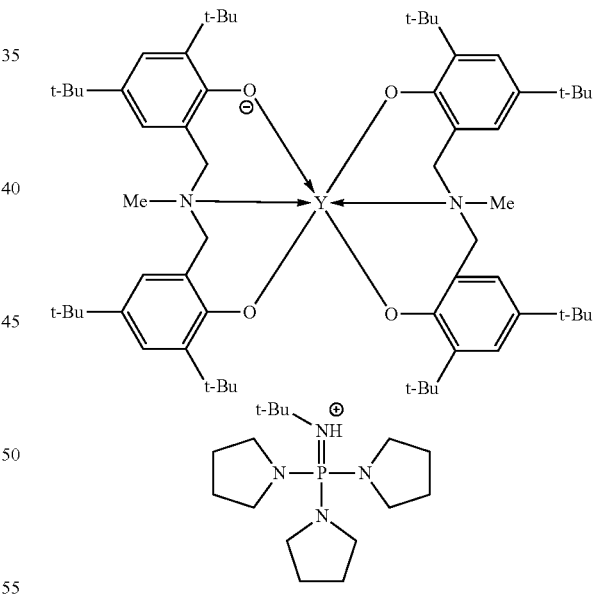

In a nitrogen-filled glovebox, a reaction vial was charged with potassium bis[6,6'-((methylazanediyl)bis(methylene)) bis(2,4-di-tert-butylphenol)]yttrium (0.300 g, 0.283 mmol, 1 equiv.). A solution of 2-methyl-N-(tri(pyrrolidin-1-yl)-λ$^5$-phosphanylidene)propan-2-aminium chloride (98.8 mg, 0.283 mmol, 1 equiv.) in dichloromethane (5 mL) was added to the yttrium complex. The 2-methyl-N-(tri(pyrrolidin-1-yl)-λ$^5$-phosphanylidene)propan-2-aminium chloride vial washed with additional dichloromethane (2×5 mL), which was added to the yttrium vial. The solution was stirred at room temperature for 2 h, yielding a clear solution with a small amount of white precipitate. The solution was passed through a 0.45 μm syringe filter and concentrated in vacuo. The white solid was triturated with toluene (5 mL). The material was only sparingly soluble in toluene. All volatiles were removed in vacuo. The white powder was triturated with hexane (5 mL). All volatiles were removed in vacuo to afford the product as a white solid (0.3549 g, 94% yield).

$^1$H NMR (400 MHz, Methylene Chloride-$d_2$) δ 7.13 (d, J=2.5 Hz, 2H), 6.96 (d, J=2.5 Hz, 2H), 6.95 (d, J=2.4 Hz, 2H), 6.84 (d, J=2.5 Hz, 2H), 4.69 (d, J=12.2 Hz, 2H), 4.57 (d, J=11.9 Hz, 2H), 3.17 (dq, J=6.6, 3.9 Hz, 12H), 2.94 (d, J=12.3 Hz, 2H), 2.83 (d, J=11.9 Hz, 2H), 2.02 (s, 6H), 1.98-1.88 (m, 12H), 1.44 (s, 18H), 1.33 (d, J=0.7 Hz, 9H), 1.32 (s, 18H), 1.27 (s, 18H), 1.02 (s, 18H). $^{13}$C NMR (101 MHz, Methylene Chloride-$d_2$) δ 163.18 (d, $J_{Y-C}$=2.1 Hz), 163.02 (d, $J_{Y-C}$=2.7 Hz), 134.75, 134.48, 132.84, 132.67, 125.32, 125.05, 124.52, 123.16, 122.52, 65.00, 64.81, 52.90 (d, $J_{P-C}$=1.2 Hz), 47.77 (d, $J_{P-C}$=4.8 Hz), 38.57, 34.85, 34.48, 33.65, 33.53, 31.78, 31.73, 31.32 (d, $J_{P-C}$=3.9 Hz), 29.46, 29.36, 26.09 (d, $J_{P-C}$=8.2 Hz). $^{31}$P NMR (162 MHz, Methylene Chloride-$d_2$) δ 21.18. HRMS (ESI) Calculated for $C_{16}H_{34}N_4P$ [M$^+$]: 313.2516; found 313.2514. Calculated for $C_{62}H_{94}N_2O_4Y$ [M$^-$] 1019.6278; found 1019.6311.

Example 15—Synthesis of N-(bis(dimethylamino)methylene)-2-methylpropan-2-aminium Bis[6,6'-((methylazanediyl)bis(methylene))bis(2,4-di-tert-butylphenol)]yttrium

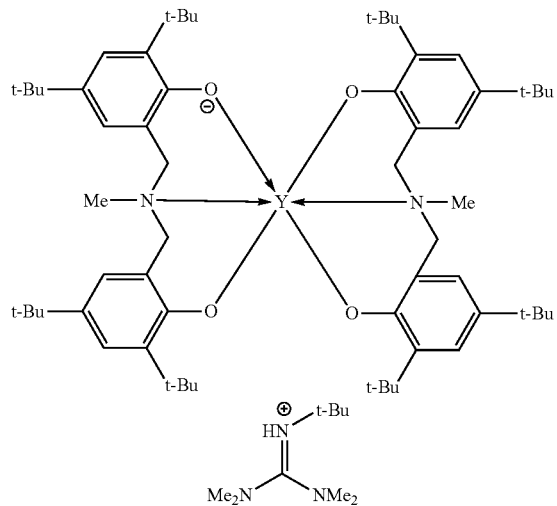

In a nitrogen-filled glovebox, a reaction vial was charged with potassium bis[6,6'-((methylazanediyl)bis(methylene))bis(2,4-di-tert-butylphenol)]yttrium (0.300 g, 0.283 mmol, 1 equiv.). A solution of N-(bis(dimethylamino)methylene)-2-methylpropan-2-aminium chloride (58.8 mg, 0.283 mmol, 1 equiv.) in dichloromethane (5 mL) was added. The N-(bis(dimethylamino)methylene)-2-methylpropan-2-aminium chloride vial was washed with additional dichloromethane (2×5 mL), and this was added to the yttrium vial. The solution was stirred at room temperature for 2 h, yielding a clear solution with a small amount of white precipitate. The solution was passed through a 0.45 μm syringe filter and concentrated in vacuo. The white solid was triturated with toluene (5 mL). The material was only sparingly soluble in toluene. All volatiles were removed in vacuo. The white powder was triturated with hexane (5 mL). All volatiles were removed in vacuo to afford the product as a white solid (0.3101 g, 92% yield).

$^1$H NMR (400 MHz, Methylene Chloride-$d_2$) δ 7.14 (d, J=2.5 Hz, 2H), 6.96 (d, J=2.5 Hz, 2H), 6.95 (d, J=2.5 Hz, 2H), 6.84 (d, J=2.5 Hz, 2H), 4.64 (d, J=12.3 Hz, 2H), 4.54 (d, J=11.8 Hz, 2H), 4.22 (br s, 1H), 2.96 (d, J=12.4 Hz, 2H), 2.84 (d, J=11.9 Hz, 2H), 2.69 (br s, 12H), 2.01 (s, 6H), 1.43 (s, 18H), 1.30 (s, 18H), 1.26 (s, 27H), 1.00 (s, 18H). $^{13}$C NMR (101 MHz, Methylene Chloride-$d_2$) δ 163.06 (d, $J_{Y-C}$=2.1 Hz), 162.91 (d, $J_{Y-C}$=2.6 Hz), 160.68, 134.82, 134.58, 133.20, 132.88, 125.42, 125.03, 124.51, 122.91, 122.70, 122.66, 64.91, 64.63, 57.66, 40.47, 38.40, 34.89, 34.47, 33.67, 33.53, 31.80, 31.70, 29.72, 29.53, 29.33. HRMS (ESI) Calculated for $C_9H_{22}N_3$[M$^+$]: 172.1808; found 172.1811. Calculated for $C_{62}H_{94}N_2O_4Y$ [M$^-$]1019.6278; found 1019.6309.

Example 16—Synthesis of 2-(tert-butyl)-4-fluorophenol

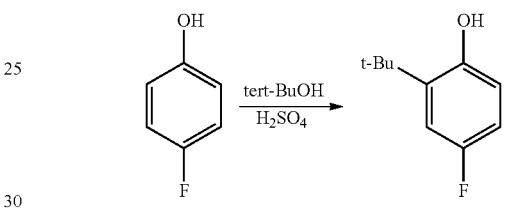

A reaction jar was charged with 4-fluorophenol (5.00 g, 44.6 mmol, 1 equiv.), dichloromethane (80 mL), tBuOH (5.9 mL, 61.8 mmol, 1.39 equiv.), and concentrated $H_2SO_4$ (3.0 mL, 56.2 mmol, 1.3 equiv.). Upon addition of the acid, the solution turned slightly amber in color. The reaction was stirred at room temperature for 18 hr. The solution was washed with water (100 mL) followed by a saturated aqueous solution of NaHCO$_3$ (150 mL). The organic phase was dried over MgSO$_4$, filtered, and concentrated in vacuo to afford an amber oil. The material was adsorbed onto silica gel and purified by flash column chromatography (ISCO, 220 g silica gel, 5-10% EtOAc in hexane). The fractions from the first major peak were concentrated in vacuo to afford the product as a pale yellow oil (3.75 g, 50% yield).

$^1$H NMR (400 MHz, Chloroform-d) δ 6.98 (dd, J=10.9, 3.1 Hz, 1H), 6.74 (ddd, J=8.6, 7.5, 3.1 Hz, 1H), 6.58 (dd, J=8.6, 4.9 Hz, 1H), 4.87-4.78 (m, 1H), 1.39 (s, 10H). $^{13}$C NMR (101 MHz, Chloroform-d) δ 157.04 (d, $J_{C-F}$=236.5 Hz), 150.09 (d, $J_{C-F}$=2.0 Hz), 138.04 (d, $J_{C-F}$=5.8 Hz), 116.91 (d, $J_{C-F}$=8.3 Hz), 113.96 (d, $J_{C-F}$=24.1 Hz), 112.61 (d, $J_{C-F}$=22.9 Hz), 34.64, 29.28. $^9$F NMR (376 MHz, Chloroform-d) δ −123.93−−124.05 (m).

Example 17—Synthesis of 6,6'-((methylazanediyl)bis(methylene))bis(2-(tert-butyl)-4-fluorophenol)

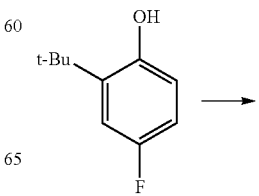

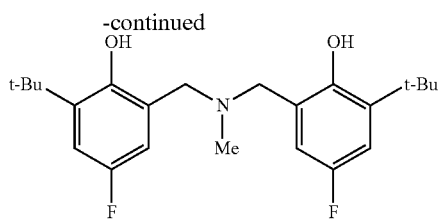

A 50 mL round bottom flask was charged with paraformaldehyde (0.578 g, 19.3 mmol, 2 equiv.), potassium hydroxide (5.4 mg, 0.096 mmol, 1 mol %), and methanol (2 mL). The solution was cooled in an ice bath. A 40% w/w aqueous solution of methylamine (0.83 mL, 9.63 mmol, 1 equiv.) was added dropwise to the methanol solution. The ice bath was removed and the reaction was allow to warm to room temperature. The cloudy white solution became clear and homogeneous, 2-tert-butyl-4-fluorophenol (3.24 g, 19.3 mmol, 2 equiv.) was added to the reaction dropwise. The 2-tert-butyl-4-fluorophenol flask was rinsed four times with 2 mL of methanol and the rinses were added to the reaction. The mixture was stirred at reflux (approximately 80° C.) for 5 days. The reaction was allowed to cool to room temperature and concentrated in vacuo. NMR showed a mixture of species. $^{19}$F NMR showed two major species, with the desired product as the major component. The material was adsorbed onto silica gel and purified by flash column chromatography (ISCO, 220 g silica gel, 1-7% EtOAc in hexane) to afford a clear oil (3161-C, 2.15 g). The material contained 25% 2-tert-butyl-4-fluorophenol. The material was adsorbed onto silica gel and purified by flash column chromatography (ISCO, 120 g silica gel, 10-30% dichloromethane in hexane gradient) to afford a clear, glassy semisolid (1.58 g, 42% yield).

$^1$H NMR (400 MHz, Chloroform-d) δ 7.71 (br s, 2H), 6.97 (dd, J=10.9, 3.1 Hz, 2H), 6.68 (dd, J=7.9, 3.1 Hz, 2H), 3.62 (s, 4H), 2.32 (s, 3H), 1.41 (s, 18H). $^{13}$C NMR (101 MHz, Chloroform-d) δ 156.04 (d, $J_{F-C}$=236.5 Hz), 150.65 (d, $J_{F-C}$=2.0 Hz), 139.06 (d, $J_{F-C}$=6.1 Hz), 123.18 (d, $J_{F-C}$=7.4 Hz), 113.98 (d, $J_{F-C}$=22.9 Hz), 113.61 (d, $J_{F-C}$=23.4 Hz), 59.38, 41.91, 34.82, 29.39. $^{19}$F NMR (376 MHz, Chloroform-d) δ −124.30−−124.61 (m). HRMS (ESI) Calculated for $C_{23}H_{31}F_2NO_2$ [M+1] 392.2396; found 392.2416.

Example 18—Synthesis of Potassium Bis[6,6'-((methylazanediyl)bis(methylene))bis(2-(tert-butyl)-4-fluorophenol)]yttrium In a nitrogen-filled glovebox, a solution of 6,6'-((methylazanediyl)bis(methylene))bis(2-(tert-butyl)-4-fluorophenol) (1.08 g, 2.76 mmol, 2 equiv.) in toluene (10 mL) was added to a reaction jar containing tris(bis(trimethylsilyl)amino)yttrium (0.787 g, 1.38 mmol, 1 equiv.) and toluene (20 mL). The 6,6'-((methylazanediyl)bis(methylene))bis(2-(tert-butyl)-4-fluorophenol) vial was rinsed twice with additional toluene (10 mL), and this was added to the reaction. Upon addition of the phenol, the reaction turned yellow. The reaction was stirred at room temperature for 2 h. All volatiles were removed in vacuo, yielding a yellow solid with some clear, glass-like material near the top. The solid was dissolved in toluene (10 mL). A solution of KHMDS (0.276 g, 1.38 mmol, 1 equiv.) in toluene (10 mL) was added. The vial containing the KHMDS solution was rinsed with additional toluene (2×5 mL), and this was added to the reaction. The yellow color of the solution dissipated upon addition of the KHMDS solution. However, even during addition, a white precipitate began to form. Some of the precipitate was caked onto the walls of the jar. All solids were triturated, and additional toluene (15 mL) was added. The reaction was stirred at room temperature for 15 h. Stirring was stopped and the suspension was allowed to settle. A clear supernate and white precipitate was observed. All volatiles were removed in vacuo. The material was triturated with hexane (40 mL). The sample was further dried in vacuo at 40° C. for 3 h, affording a white solid (1.38 g). The material was dissolved in THF (20 mL) and briefly stirred. All volatiles were removed in vacuo. The residue was triturated with toluene (20 mL), and all volatiles were removed in vacuo, yielding a white solid $^1$H NMR (400 MHz, THF-ds) δ 6.72 (dd, J=11.3, 3.3 Hz, 2H), 6.60 (t, J=2.9 Hz, 2H), 6.58 (d, J=3.2 Hz, 2H), 6.51 (dd, J=8.6, 3.2 Hz, 2H), 4.64 (dd, J=12.0, 5.5 Hz, 4H), 2.83 (dd, J=28.1, 12.1 Hz, 4H), 2.02 (s, 6H), 1.37 (s, 18H), 1.02 (s, 18H). $^{13}$C NMR (101 MHz, THF-ds) δ 163.05 (d, $J_{Y-C}$=1.9 Hz), 162.80 (d, $J_{Y-C}$=1.9 Hz), 153.61 (d, $J_{F-C}$=226.5 Hz), 153.49 (d, $J_{F-C}$=225.7 Hz), 138.59 (d, $J_{F-C}$=5.6 Hz), 138.07 (d, $J_{F-C}$=5.6 Hz), 126.08 (d, $J_{F-C}$=7.0 Hz), 125.12 (d, $J_{F-C}$=7.3 Hz), 115.37 (d, $J_{F-C}$=15.2 Hz), 115.16 (d, $J_{F-C}$=15.0 Hz), 113.97 (d, $J_{F-C}$=18.5 Hz), 113.75 (d, $J_{F-C}$=18.5 Hz), 66.23, 65.61, 40.04, 36.40, 36.10, 30.98, 30.98. $^9$F NMR (376 MHz, THF-ds) δ −134.98 (dd, J=11.2, 8.9 Hz), −135.52 (dd, J=10.8, 8.7 Hz). HRMS (ESI) Calculated for $C_{46}H_{58}F_4N_2O_4Y$ [M⁻] 867.3397; found 867.3416.

Example 18—Synthesis of N-methyl-dioctylaminium Bis[6,6'-((methylazanediyl)bis(methylene))bis(2-(tert-butyl)-4-fluorophenol)]yttrium

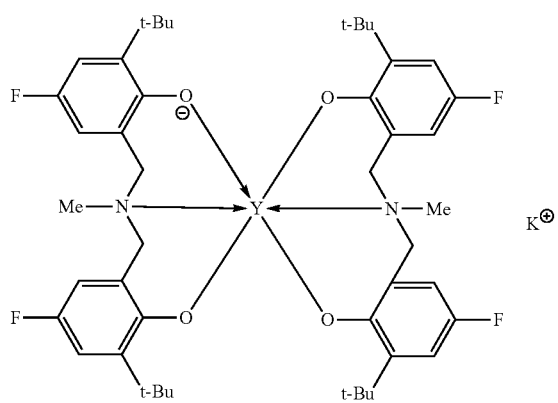

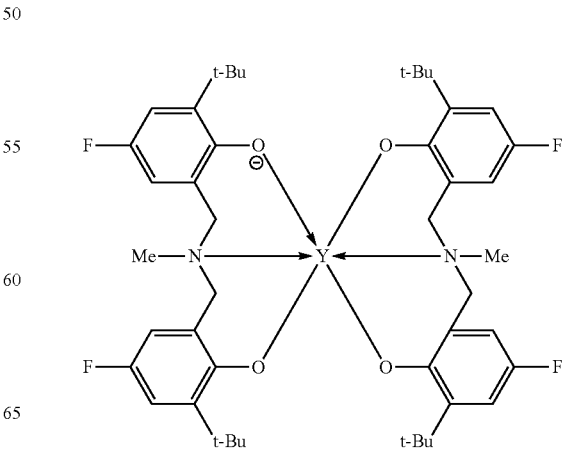

-continued

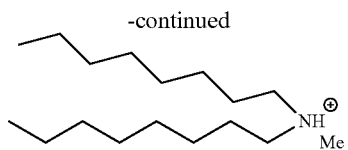

In a nitrogen-filled glovebox, a reaction vial was charged with potassium bis[6,6'-((methylazanediyl)bis(methylene))bis(2-(tert-butyl)-4-fluorophenol)]yttrium (also contains approximately 1 equiv. of toluene) (0.300 g, 0.300 mmol, 1 equiv.). A solution of N-methyl-dioctylaminium chloride (87.7 mg, 0.300 mmol, 1 equiv.), in dichloromethane (5 mL) was added. The N-methyl-dioctylaminium chloride vial was washed twice with additional 5 mL of dichloromethane, and these washes were added to the reaction. The solution was stirred at room temperature for 3 h. A slightly yellow solution with fine precipitate was formed. The suspension was passed through a 0.45 µm syringe filter, yielding a clear, slightly yellow solution. All volatiles were removed in vacuo to afford a pale yellow solid with some gel-like portions. The residue was triturated with hexane (10 mL). A sticky oil separated from the hexane solution. Some toluene (10 mL) was used to wash the walls of the jar and spatula. All volatiles were removed in vacuo, yielding a yellow oil. The oil was triturated with hexane (10 mL), and all volatiles were removed in vacuo, yielding a pale yellow solid (0.292 g, 86% yield).

$^1$H NMR (400 MHz, Benzene-$d_6$) δ 7.88 (br s, 1H), 7.13 (dd, J=11.2, 3.3 Hz, 2H), 7.09-7.05 (m, 2H), 6.84 (dd, J=8.3, 3.2 Hz, 2H), 6.73 (dd, J=8.0, 3.3 Hz, 2H), 4.67 (d, J=12.1 Hz, 2H), 4.32 (d, J=11.9 Hz, 2H), 2.75 (d, J=12.2 Hz, 2H), 2.67 (d, J=12.0 Hz, 2H), 2.10 (s, 10H), 1.91 (s, 3H), 1.42 (s, 18H), 1.35-1.15 (m, 12H), 1.21 (s, 18H), 1.10-1.00 (m, 4H), 0.92 (t, J=7.1 Hz, 6H), 0.87-0.71 (m, 8H). $^{13}$C NMR (101 MHz, Benzene-$d_6$) δ 160.69-160.60 (m), 160.01-159.92 (m), 152.91 (d, $J_{F-C}$=230.6 Hz), 152.66 (d, $J_{F-C}$=227.4 Hz), 138.35 (d, $J_{F-C}$=5.4 Hz), 137.46 (d, $J_{F-C}$=5.6 Hz), 124.83 (d, $J_{F-C}$=7.0 Hz), 123.05 (d, $J_{F-C}$=7.3 Hz), 115.01 (d, $J_{F-C}$=21.6 Hz), 114.33 (d, $J_{F-C}$=22.4 Hz), 114.06 (d, $J_{F-C}$=21.8 Hz), 113.46 (d, $J_{F-C}$=22.4 Hz), 64.64, 63.68, 55.56, 39.66, 39.07, 35.18, 34.63, 30.02, 29.49, 29.03, 26.18, 23.24, 22.64, 13.94. $^{19}$F NMR (376 MHz, Benzene-$d_6$) δ −129.81, −131.81--132.28 (m). HRMS (ESI) Calculated for $C_{17}H_{38}N$ [M+] 256.2999; found 256.2989. Calculated for $C_{46}H_{58}F_4N_2O_4Y$ [M−] 867.3397; found 867.3416.

Example 19—Synthesis of 2-(tert-butyl)-3,4,5-trifluorophenol

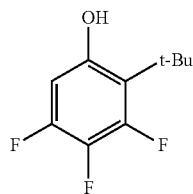 [SMILES: CC(C)(C)c1c(O)cc(F)c(F)c1F]

In a nitrogen-filled glovebox, a reaction vial was charged with 3,4,5-trifluorophenol (3.00 g, 20.3 mmol, 1 equiv.), ZrCl$_4$ (2.36 g, 10.1 mmol, 0.5 equiv.) and MTBE (5.3 mL, 44.6 mmol, 2.2 equiv.). Upon addition of the MTBE, a significant exotherm was observed. The vial was capped, removed from the glovebox, and stirred at 50° C. for 4 days. The reaction became crimson in color. The reaction was allowed to settle and cool to room temperature. The mixture was poured onto saturated aqueous NH$_4$Cl (70 mL), 2 M aqueous HCl (30 mL) was added. The aqueous phase was washed with diethyl ether (3×50 mL). When quenched, the color changed to a pale yellow. The organic phase was dried over MgSO$_4$, filtered, and concentrated in vacuo. The color changed back to a dark purple upon concentration. The material was adsorbed onto silica gel and purified by flash column chromatography (ISCO, 120 g silica gel, 20-40% CH$_2$Cl$_2$ in hexane), to afford the product as a green solid (2.17 g, 16% yield).

$^1$H NMR (400 MHz, Chloroform-d) δ 6.31 (ddd, J=10.8, 6.5, 2.4 Hz, 1H), 4.92 (s, 1H), 1.47 (d, J=3.2 Hz, 9H). $^{19}$F NMR (376 MHz, Chloroform-d) δ −130.25 (dtq, J=19.1, 6.4, 2.9 Hz), −139.11 (ddd, J=22.1, 10.8, 7.1 Hz), −170.07 (ddd, J=21.9, 19.3, 6.5 Hz). $^{13}$C NMR (101 MHz, Chloroform-d) δ 151.19 (ddd, $J_{F-C}$=248.2, 10.9, 5.0 Hz), 149.72-146.66 (m, 2 Carbons), 135.38 (ddd, $J_{F-C}$=241.5, 19.3, 14.3 Hz), 120.18 (ddd, $J_{F-C}$=11.0, 4.4, 3.3 Hz), 100.43 (dd, $J_{F-C}$=19.3, 3.1 Hz), 36.12 (dd, $J_{F-C}$=2.9, 1.2 Hz), 30.74 (d, $J_{F-C}$=5.9 Hz). HRMS (ESI) Calculated for $C_{10}H_{11}F_3O$ [M−1]: 204.0762; found 204.0718.

Example 20—Synthesis of 6,6'-((methylazanediyl)bis(methylene))bis(2-(tert-butyl)-3,4,5-trifluorophenol)

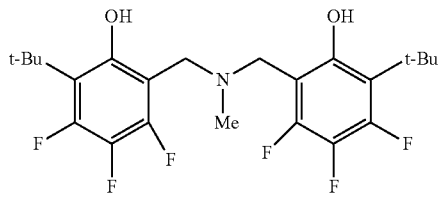 [SMILES: CN(Cc1c(O)c(C(C)(C)C)c(F)c(F)c1F)Cc1c(O)c(C(C)(C)C)c(F)c(F)c1F]

A 25 mL round bottom flask was charged with paraformaldehyde (0.297 g, 9.89 mmol, 2 equiv.), potassium hydroxide (2.8 mg, 0.0495 mmol, 1 mol %), and methanol (1 mL). A 40% w/w aqueous solution of methylamine (0.43 mL, 2.34 mmol, 1 equiv.) was added dropwise to the methanol solution. Most solid dissolved, but the solution was still cloudy, 2-(tert-butyl)-3,4,5-trifluorophenol (2.02 g, 9.89 mmol, 2 equiv.) was added to the reaction. The 2-(tert-butyl)-3,4,5-trifluorophenol vial was rinsed four times with 1 mL of methanol, and the rinses were added to the reaction. The mixture was stirred at reflux (100° C.) for 4 days, yielding an orange solution. The solution was concentrated in vacuo, adsorbed onto silica gel, and purified by flash column chromatography (ISCO, 120 g silica gel, 3-20% EtOAc in hexane to afford the product as an orange oil (0.96 g, 42% yield).

$^1$H NMR (400 MHz, Chloroform-d) δ 8.52 (s, 2H), 3.75 (d, J=1.9 Hz, 4H), 2.39 (s, 3H), 1.49 (d, J=3.4 Hz, 18H). $^{19}$F NMR (376 MHz, Chloroform-d) δ −131.23 (dtd, J=20.2, 6.6, 3.2 Hz, 2F), −142.88 (dd, J=22.7, 7.3 Hz, 2F), −171.09 (dd, J=22.6, 20.4 Hz, 2F). $^{13}$C NMR (101 MHz, Chloroform-d) δ 150.84 (ddd, $J_{F-C}$=9.7, 5.8, 3.4 Hz), 150.50 (ddd, $J_{F-C}$=248.4, 10.9, 5.4 Hz), 147.35 (ddd, $J_{F-C}$=244.9, 11.0, 6.3 Hz), 134.77 (ddd, $J_{F-C}$=241.1, 19.4, 15.5 Hz), 120.47 (ddd, $J_{F-C}$=10.1, 4.5, 3.0 Hz), 106.54 (ddd, $J_{F-C}$=12.5, 3.5, 1.4 Hz), 50.29, 41.41, 30.71 (d, $J_{F-C}$=5.9 Hz). HRMS (ESI) Calculated for $C_{23}H_{27}F_6NO_2$ [M+1]: 464.2019; found 464.2015.

Example 21—Synthesis of Potassium Bis[6,6'-((methylazanediyl)bis(methylene))bis(2-(tert-butyl)-3,4,5-trifluorophenol)]yttrium

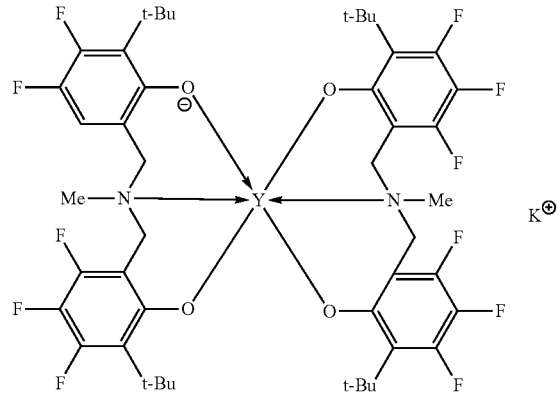

In a nitrogen-filled glovebox, a solution of 6,6'-((methyl-azanediyl)bis(methylene))bis(2-(tert-butyl)-3,4,5-trifluorophenol) (0.681 g, 1.47 mmol, 2 equiv.) in toluene (5 mL) was added to a reaction jar containing tris(bis(trimethylsilyl)amino)yttrium (0.419 g, 0.735 mmol, 1 equiv.) and toluene (5 mL). The 6,6'-((methylazanediyl)bis(methylene))bis(2-(tert-butyl)-3,4,5-trifluorophenol) vial was rinsed three times with additional 5 mL of toluene, and this was added to the reaction. Immediately upon addition of the yellow phenol, the reaction turned orange. The reaction was stirred at room temperature for 2 h. All volatiles were removed in vacuo to afford an orange solid. The solid was dissolved in toluene (15 mL). A solution of KHMDS (146.6 mg, 0.735 mmol, 1 equiv.) in toluene (3 mL) was added, resulting in the immediate precipitation of a solid and a color change to yellow. The KHMDS vial was washed with toluene (3×3 mL), and this was added to the reaction. The reaction was allowed to stir at room temperature for 2 h. The precipitate still remained. All volatiles were removed in vacuo, yielding an off-white powder. The solid was dissolved in THF (15 mL) and briefly stirred. All volatiles were removed in vacuo. The solid was triturated with toluene (10 mL), and again all volatiles were removed in vacuo to yield the product as an off-white solid (0.825 g, 98% yield). The material contained 0.5 equiv. of toluene and 0.75 equiv. of THF.

$^1$H NMR (400 MHz, THF-ds) δ 4.21 (dd, J=12.8, 2.2 Hz, 4H), 3.52 (d, J=12.7 Hz, 2H), 3.43 (d, J=12.5 Hz, 2H), 2.02 (s, 6H), 1.47 (d, J=3.4 Hz, 18H), 1.14 (d, J=3.2 Hz, 18H). $^{19}$F NMR (376 MHz, THF-ds) δ -137.52 (d, J=19.9 Hz, 4F), -147.66 (dddd, J=330.6, 23.7, 6.2, 3.0 Hz, 4F), -182.73 (ddd, J=186.2, 23.6, 21.3 Hz, 4F). $^{13}$C NMR was complex due to extensive C—F and C—Y couplings. HRMS (ESI) Calculated for $C_{46}H_{50}F_{12}N_2O_4Y$ [M$^-$] 1011.2643; found 1011.2669.

Example 22—Synthesis of Activator 2, Armeenium M2HT Bis[6,6'-((methylazanediyl)bis(methylene))bis(2-(tert-butyl)-3,4,5-trifluorophenol)]yttrium-Activator 2

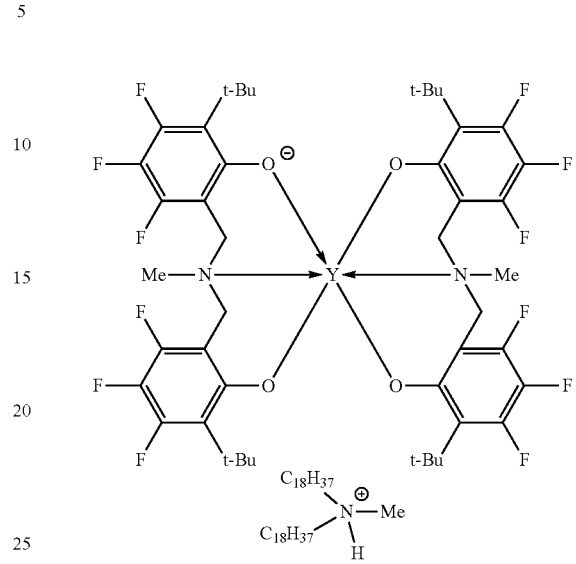

In a nitrogen-filled glovebox, potassium bis[6,6'-((methylazanediyl)bis(methylene))bis(2-(tert-butyl)-3,4,5-trifluorophenol)]yttrium (0.200 g, 0.174 mmol, 1 equiv.) and Armeenium M2HT hydrochloride (99.5 mg, 0.174 mmol, 1 equiv.) were stirred in toluene (10 mL) for 5 days, yielding a turbid yellow solution. The reaction mixture was passed through a 0.45 μm syringe filter in line with a 0.2 μm syringe filter, yielding a clear yellow solution. All volatiles were removed in vacuo, yielding a yellow oil. The oil was triturated with hexane (5 mL) and all volatiles were removed in vacuo (this process was repeated for a total of two times) to afford the product as a yellow oil (0.226 g, 84% yield).

$^1$H NMR (400 MHz, Toluene-d$_8$) δ 4.46 (d, J=12.3 Hz, 4H), 3.72 (d, J=12.7 Hz, 2H), 3.64 (d, J=12.5 Hz, 2H), 2.27 (s, 4H), 2.22-2.13 (m, 4H), 1.91 (s, 2H), 1.72 (d, J=3.2 Hz, 18H), 1.43-1.16 (m, 75H), 1.12-1.01 (m, 4H), 0.99-0.80 (m, 12H). $^{19}$F NMR (376 MHz, Toluene-d$_8$) δ -135.80 (d, J=22.1 Hz, 2F), -136.36 (d, J=22.3 Hz, 2F), -145.37 (dd, J=24.1, 5.8 Hz, 2F), -146.59 (dd, J=24.2, 5.9 Hz, 2F), -180.34 (t, J=23.1 Hz, 2F), -181.14 (t, J=23.0 Hz, 2F). $^{13}$C NMR was complex due to extensive C—F and C—Y couplings. HRMS (ESI) Calculated for $C_{37}H_{78}N$ [M$^+$] 536.6129; found 536.6129. Calculated for $C_{46}H_{50}F_{12}N_2O_4Y$ [M$^-$] 1011.2643; found 1011.2640.

Example 23—Polymerization Results

Polymerizations were carried out in a batch reactor to assess activator efficiency and resulting polymer characteristics for Activators 1-2. The catalyst systems for the polymerizations included an activator having a structure according to formula (I) or a comparative activator not having a structure according to formula (I), with Procatalyst A or Procatalyst B as the procatalyst. Procatalyst A is a bis-biphenylphenoxy procatalyst (structure shown below) having a structure according to formula (X).

Procatalyst A
Procatalyst B
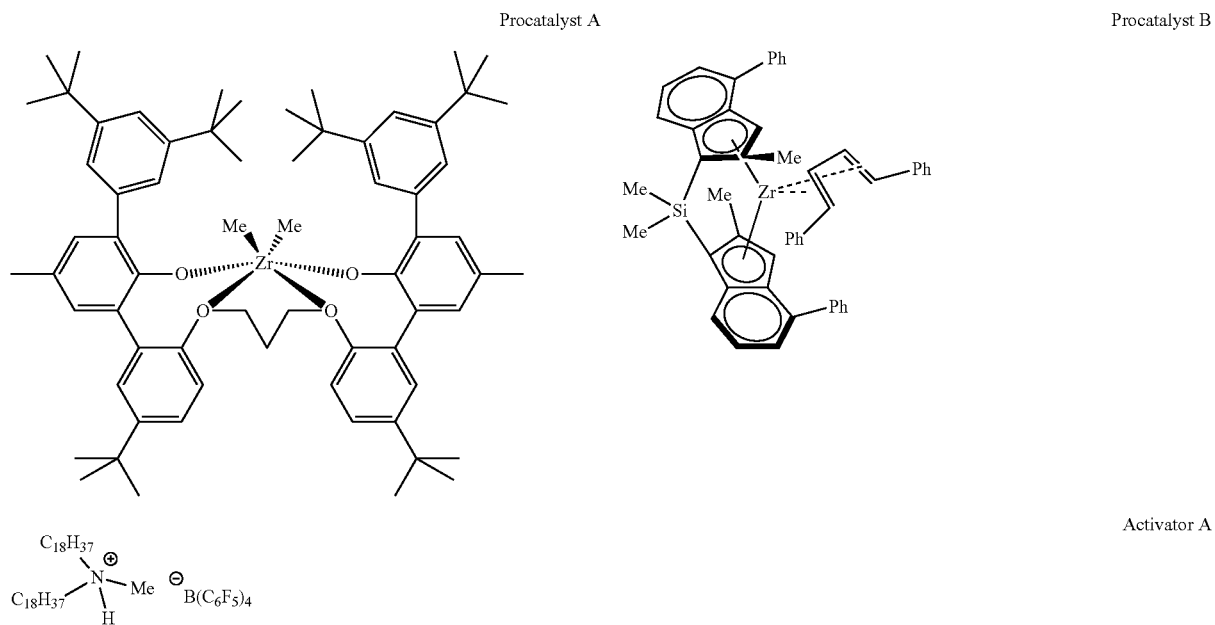
Activator A
Comparative C1
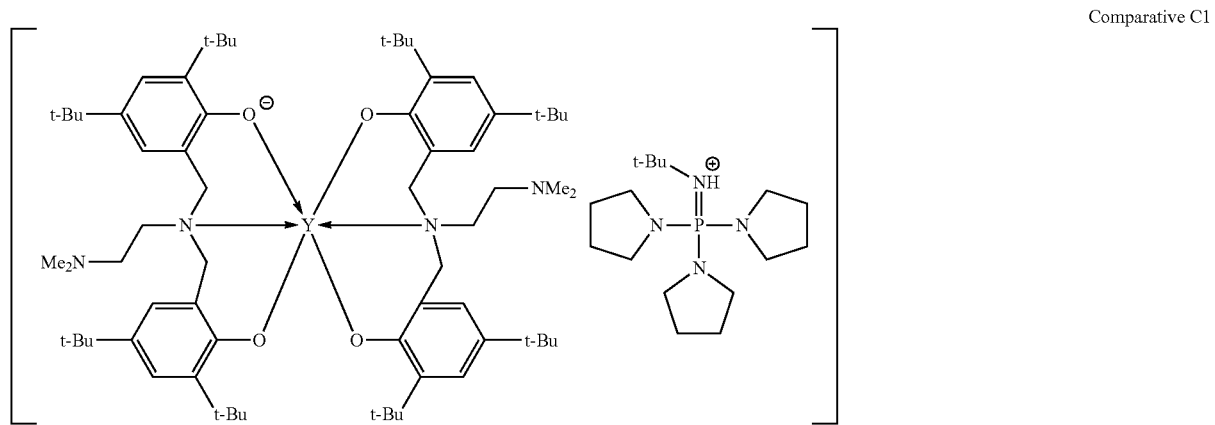
Comparative C2
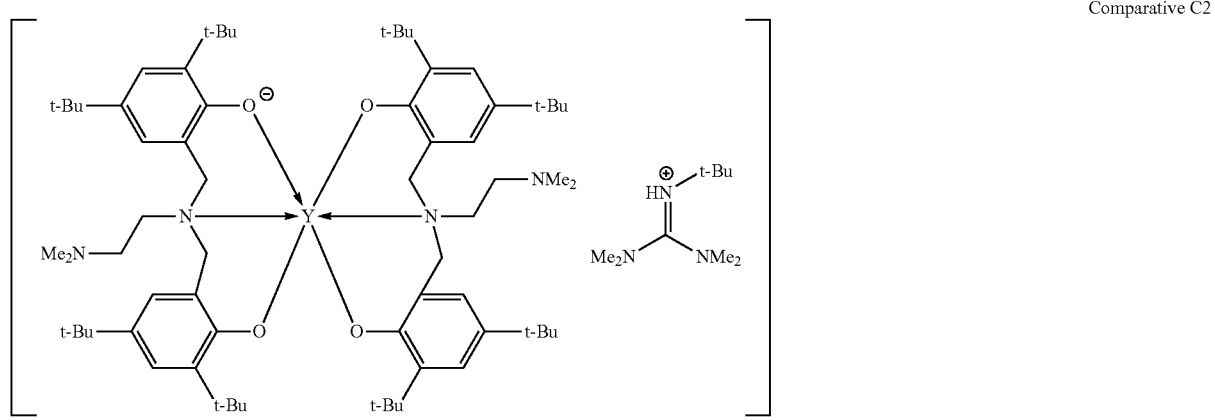

-continued
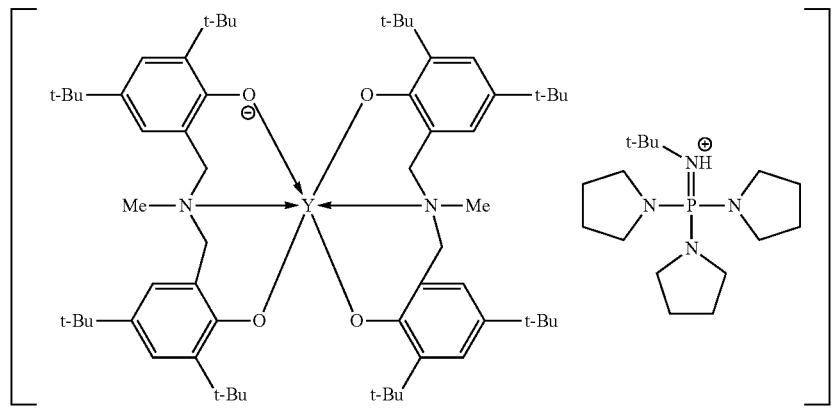
Comparative C3
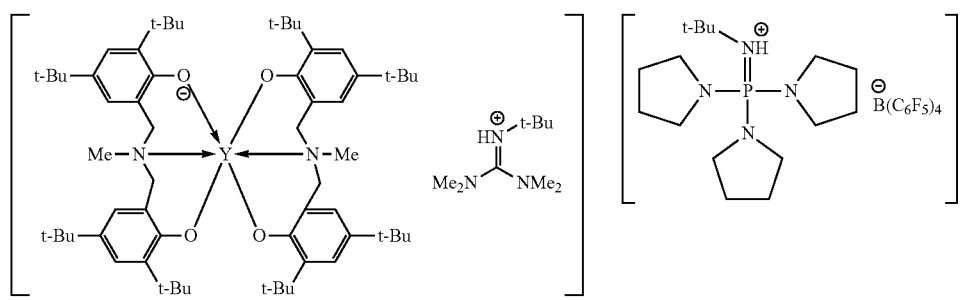
Comparative C4　　Comparative C5
Comparative C6
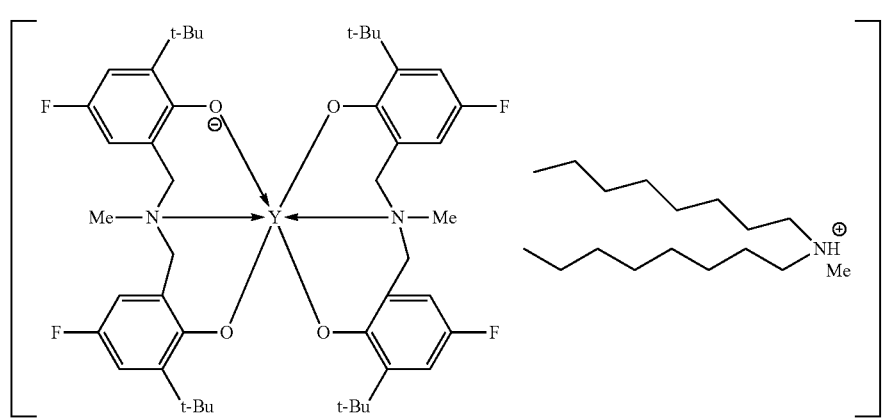
Activator 1

-continued

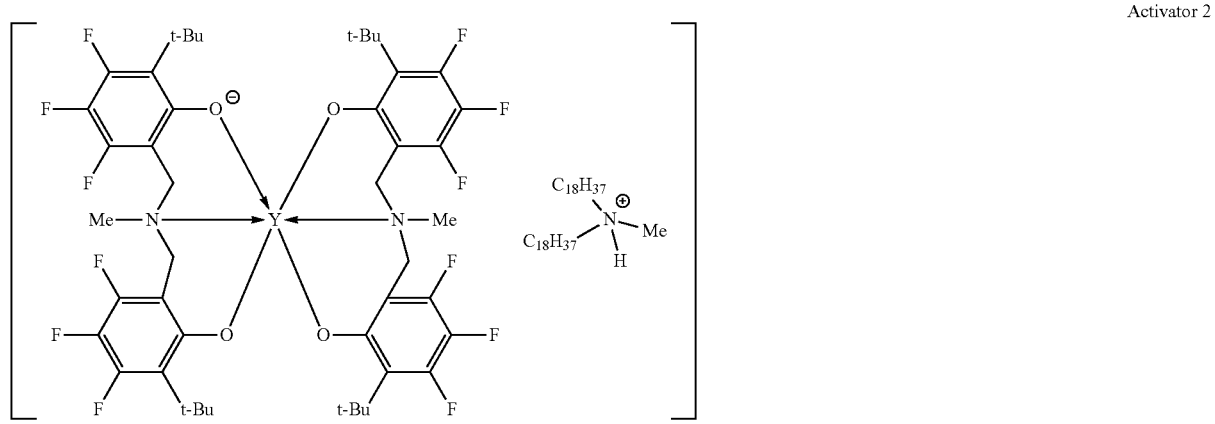

Activator 2

The efficiencies of the inventive Activators 1 and 2 and Comparative C1-C6. The results are summarized in Tables 1, 2 3, and 4. The data in Tables 1, 2, 3, and 4 were obtained at 140° C. polymerization temperature.

TABLE 1

1 Gallon Batch Reactor Results with Procatalyst A

| Activator | Procatalyst A (μmol) | $C_2H_4$ Uptake (g) | Efficiency ($C_2H_4$ Uptake/ g Metal) | Efficiency Compared to Activator A (%) |
|---|---|---|---|---|
| Activator A | 0.3125 | 51 | 1,793,970 | 100.0 |
| None (TEA) | 1 | 27.0 | 295,975 | 16.5 |
| C6 | 2.5 | 6.4 | 28,021 | 1.6 |
| C5 | 2.5 | 57.5 | 252,082 | 14.1 |
| C2 | 4.2 | 5.0 | 13,050 | 0.7 |
| C1 | 10 | 3.4 | 3,740 | 0.2 |
| C4 | 4.2 | 3.1 | 8,069 | 0.4 |
| C3 | 5 | 1.5 | 3,286 | 0.2 |

Polymerization Conditions: 415 psig of $C_2H_4$, 215 g octene, 1350 g Isopar E; procatalyst: activator ratio is 1:1.2.

TABLE 2

2 L Batch Reactor Data with Procatalyst A

| Activator | Polymer Yield (g) | Efficiency (g poly/g metal) | Efficiency Compared to Activator A (%) |
|---|---|---|---|
| Activator A | 23.9 | 17,466,164 | 100 |
| None (TEA) | 3.7 | 2,703,967 | 16.3 |
| C6 | 2.6 | 1,900,085 | 13.4 |
| Activator 1 | 9.7 | 7,088,778 | 50.1 |

Polymerization Conditions: 360 psig $C_2H_4$, 104 g octene, 693 g Isopar E, 0.75 μmol TEA, 0.015 μmol Procatalyst A; procatalyst: activator ratio is 1:1.2.

The addition of a fluorine atom to the yttrium complex increased the efficiency of the activator when compared to an yttrium complex lacking fluorine.

TABLE 3

2 L Batch Reactor Data with Procatalyst A

| Activator | Polymer Yield (g) | Efficiency (g poly/g metal) | Efficiency Compared to Activator A (%) |
|---|---|---|---|
| Activator A | 40 | 4,384,811 | 100 |
| Activator 1 | 14.3 | 1,567,570 | 35.8 |
| Activator 2 | 24.6 | 2,696,659 | 61.5 |

Polymerization Conditions: 288 psig $C_2H_4$, 300 g octene, 605 g Isopar E, 10 μmol TEA, 0.1 μmol Procatalyst A; procatalyst: activator ratio is 1:1.2.

TABLE 4

2 L Batch Reactor Data with Procatalyst B

| Activator | Polymer Yield (g) | Efficiency (g poly/g metal) | Efficiency Compared to Activator A (%) |
|---|---|---|---|
| Activator A | 71.3 | 781,593 | 100 |
| Activator 2 | 46.8 | 513,023 | 65.6 |

Polymerization Conditions: 288 psig $C_2H_4$, 300 g octene, 605 g Isopar E, 0 μmol TEA, 1 μmol Procatalyst B; procatalyst: activator ratio is 1:1.2.

Computational Methodology: Ground state geometries of all the anions are optimized using Density Functional Theory (DFT) at the B971/6-31g** level. Effective core potential of Y is incorporated by including SDD basis set on those atoms. The ground state of the anions are assumed to be in singlet closed-shell configurations. The effect of the dielectric medium is incorporated using the conductor-like polarizable continuum model (cpcm); cyclohexane is chosen to represent the medium. Since the energies of cation and anion are computed separately, the electrostatic interaction between them is not accounted for in these calculations. In order to take this into account, the electrostatic potential at every atom of the reactants (both reactant-1 and reactant-2) are computed using Merz-Kollman-Singh population analysis, where the radii of each atoms is taken from Universal force field (mkuff). These calculations are performed using G09 suite of programs. The electrostatic interaction between anion and cation is computed using the following steps; at first, the charges on each atom of anion (obtained using mkuff method) are scaled by 0.5 (dielectric constant of cyclohexane is 2.0) and the relative distance and orientation between anion and cation is optimized using universal force field. For the force-field calculation, individual geometries of anion and cation are not allowed to relax and the cut-off distance for neglecting the electrostatic and van der Waals interactions is chosen to be 200 Å. Various initial conformations are chosen by varying the relative orientation and the distance between anion and cation, which are then subjected to force-field optimization procedures. The conformation with the highest electrostatic interaction (Eelec; most negative value) is used to compute the final energy of the cation-anion pair. The force-field calculation is performed using the Forcite module, as implemented in Materials Studio 8.0. All energies are reported in kcal/mol.

The catalyst systems including an activator having more than one fluorine atom substituting each phenol moiety (in other words, more than 4 in the yttrium complex) had greater efficiencies than those of the catalyst systems in which the activator did not have more than one fluorine atom substituting each phenol moiety. A basis for the increased efficiency of the catalyst systems, including activators with larger number of fluorine atoms in the yttrium complex, is due to the increase of $\Delta E_{prot}$ with the addition of fluorine atoms to the complex (Table 5). In other words, these calculations indicate that the $R_3NH^+$ charged species, which activates the catalyst systems, is stabilized by the presence of fluorine atoms. The higher the number of fluorine atoms, the more stable the charged species, which is required for the activation of the procatalyst. Similar calculations (Table 6) indicate that the cations from Comparative C5 and Comparative C6 are expected to perform poorly compared to the cation from Activator A (Armeen M2HT is approximated as $Et_2NMe$); negative $\Delta E_{Act}$ results in favorable activation of procatalysts.

TABLE 5

Effect of F-atoms on computed protonation energy of anion ($\Delta E_{prot}$)

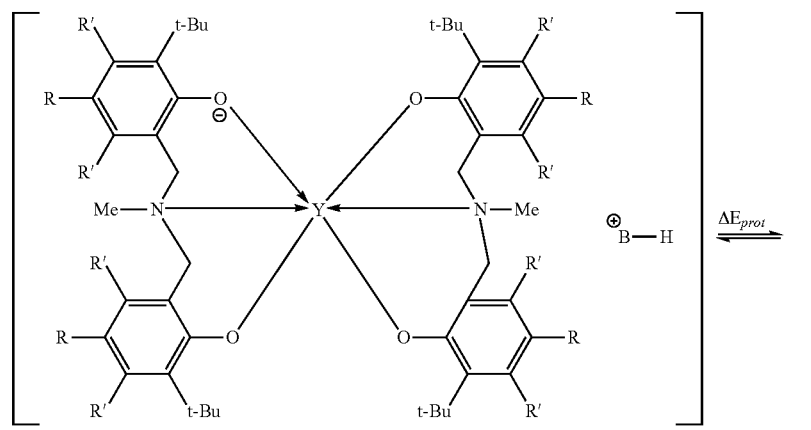

| R | R' | B = PhNMe$_2$ | B = Armeen M2HT |
|---|---|---|---|
| tBu | H | −8.3 | −4.5 |
| F | F | 2.9 | 9.1 |

TABLE 6
Effect of changing the activators on protonation energy ($\Delta E_{Act}$) of procatalyst-A
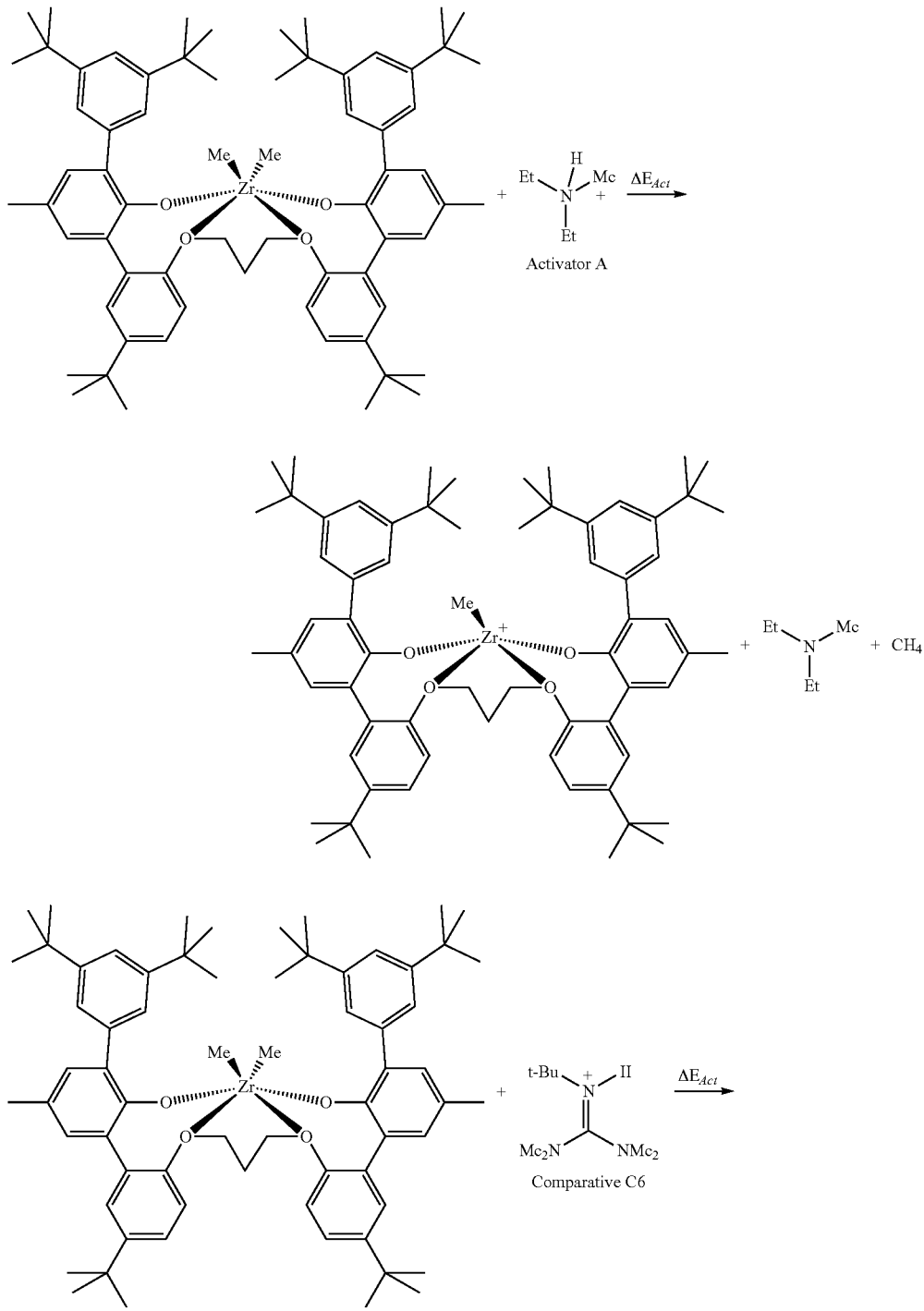

TABLE 6-continued
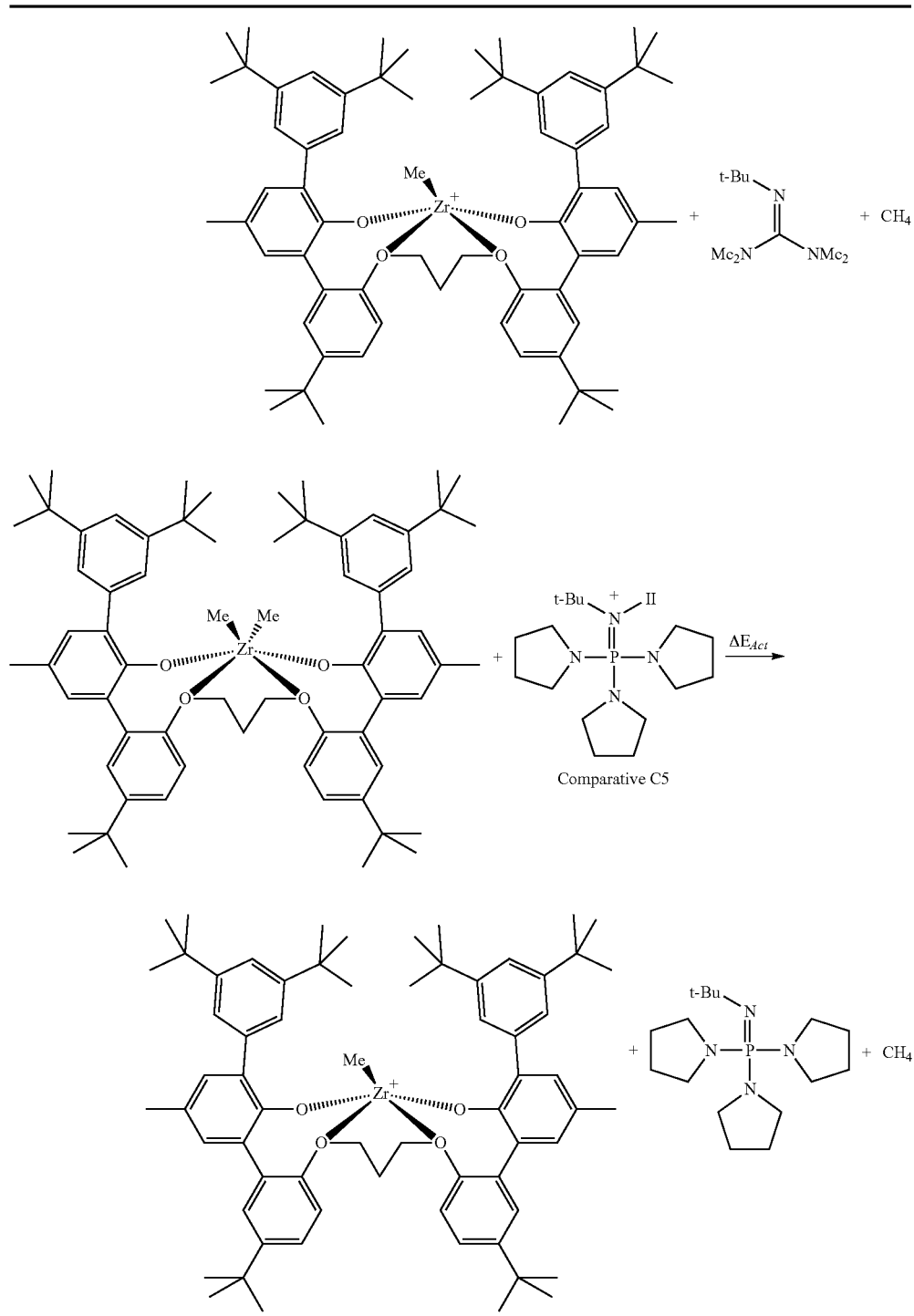
| Species | ΔE$_{Act}$ (kcal/mol) |
| --- | --- |
| Activator A | −16.2 |
| Comparative C6 | 3.2 |
| Comparative C5 | 8.4 |

The invention claimed is:

1. An activator having a structure according to formula (I):

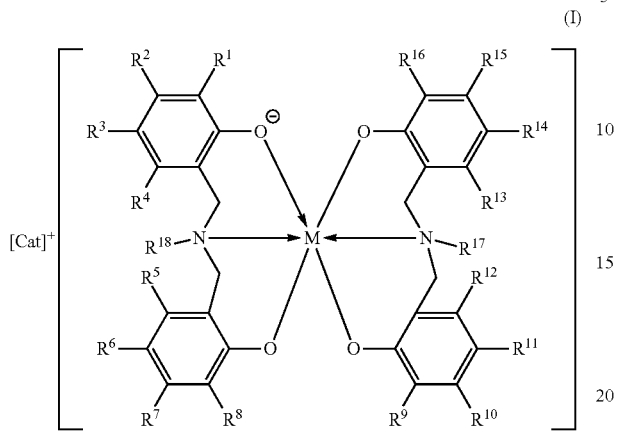

where:
- M is a metal in a +3 oxidation state, the metal being selected from boron, aluminum, gallium, scandium, yttrium, or a lanthanide;
- $[Cat]^+$ is $^+N(H)R^N{}_3$, wherein each $R^N$ is independently $(C_1$-$C_{20})$ alkyl; or $^+C(C_6H_4R^C)_3$, wherein each $R^C$ is independently chosen from $(C_1$-$C_{30})$ alkyl; or $[HN(R^S)(R^N)_2]^+$, where $R^N$ is $(C_1$-$C_{20})$ alkyl and $R^S$ is chosen from $(C_1$-$C_{30})$ alkyl, $(C_6$-$C_{20})$ aryl, $(C_5$-$C_{20})$ heteroaryl, or —H;
- $R^1$, $R^2$, $R^3$, $R^4$ $R^5$, $R^6$, $R^7$, $R^8$, $R^9$, $R^{10}$, $R^{11}$, $R^{12}$, $R^{13}$, $R^{14}$, $R^{15}$, and $R^{16}$ are independently chosen from $(C_1$-$C_{40})$ alkyl, $(C_6$-$C_{40})$ aryl, —H, —NR$^C{}_2$, —OR$^C$, —SR$^C$, or halogen, wherein each $R^C$ is independently a $(C_1$-$C_{30})$ hydrocarbyl or —H, provided at least one of $R^{1-4}$, and one of $R^{5-8}$, and one of $R^{9-12}$, and one of $R^{13-16}$ is a fluorine-substituted $(C_1$-$C_{40})$ alkyl, a fluorine-substituted $(C_6$-$C_{40})$ aryl, or —F; and
- $R^{17}$ and $R^{18}$ are $(C_1$-$C_{40})$ alkyl, $(C_1$-$C_{40})$ heteroalkyl, a fluorine-substituted $(C_1$-$C_{40})$ alkyl, or a fluorine-substituted $(C_6$-$C_{40})$ aryl.

2. The activator of claim 1, wherein $R^1$, $R^2$, $R^3$, $R^4$ $R^5$, $R^6$, $R^7$, $R^8$, $R^9$, $R^{10}$ $R^{11}$, $R^{12}$, $R^{13}$, $R^{14}$, $R^{15}$, and $R^{16}$ are independently $(C_1$-$C_{10})$ alkyl, —F, or —H, provided at least one of $R^{1-4}$, and one of $R^{5-8}$, and one of $R^{9-12}$, and one of $R^{13-16}$ is a fluorine-substituted $(C_1$-$C_{10})$ alkyl or —F.

3. The activator of claim 1, wherein $R^{17}$ and $R^{18}$ are $(C_1$-$C_{10})$ alkyl.

4. The activator of claim 1, wherein $[Cat]^+$ is a protonated tertiary amine.

5. The activator of claim 1, wherein $[Cat]^+$ is $^+N(H)R^N{}_3$, wherein each $R^N$ is independently $(C_1$-$C_{20})$ alkyl.

6. The activator of claim 1, wherein:
- at least one of $R^1$, $R^2$, $R^3$, and $R^4$ is —F or fluoroalkyl;
- at least one of $R^5$, $R^6$, $R^7$, and $R^8$ is —F or fluoroalkyl;
- at least one of $R^9$, $R^{10}$, $R^{11}$, and $R^{12}$ is —F or fluoroalkyl; and
- at least one of $R^{13}$, $R^{14}$, $R^{15}$, and $R^{16}$ is —F or fluoroalkyl.

7. The activator of claim 1, wherein:
- at least two of $R^1$, $R^2$, $R^3$, and $R^4$ are —F or fluoroalkyl;
- at least two of $R^5$, $R^6$, $R^7$, and $R^8$ are —F or fluoroalkyl;
- at least two of $R^9$, $R^{10}$, $R^{11}$, and $R^{12}$ are —F or fluoroalkyl; and
- at least two of $R^{13}$, $R^{14}$, $R^{15}$, and $R^{16}$ are —F or fluoroalkyl.

8. The activator of claim 1, wherein:
- at least three of $R^1$, $R^2$, $R^3$, and $R^4$ are —F or fluoroalkyl;
- at least three of $R^5$, $R^6$, $R^7$, and $R^8$ are —F or fluoroalkyl;
- at least three of $R^9$, $R^{10}$, $R^{11}$, and $R^{12}$ are —F or fluoroalkyl; and
- at least three of $R^{13}$, $R^{14}$, $R^{15}$, and $R^{16}$ are —F or fluoroalkyl.

9. The activator of claim 1, wherein:
- at least four of $R^1$, $R^2$, $R^3$, and $R^4$ are —F or fluoroalkyl;
- at least four of $R^5$, $R^6$, $R^7$, and $R^8$ are —F or fluoroalkyl;
- at least four of $R^9$, $R^{10}$, $R^{11}$, and $R^{12}$ are —F or fluoroalkyl; and
- at least four of $R^{13}$, $R^{14}$, $R^{15}$, and $R^{16}$ are —F or fluoroalkyl.

10. A catalyst system comprising an activator of claim 1 and a procatalyst, wherein the procatalyst is rendered catalytically active by contacting the procatalyst with the activator.

11. A process for polymerizing olefins, the process comprising contacting ethylene and optionally a $(C_3$-$C_{40})\alpha$-olefin in the presences of a catalysts system according to claim 10.

* * * * *